(12) United States Patent
Laleg et al.

(10) Patent No.: US 8,404,084 B2
(45) Date of Patent: Mar. 26, 2013

(54) LATEX-TREATED FILLER SLURRIES FOR USE IN PAPERMAKING

(75) Inventors: Makhlouf Laleg, Pointe-Claire (CA);
Roderick Collins, Pierrefonds (CA);
Danielle Gagne, Pierrefonds (CA);
Steven Middleton, Pointe-Claire (CA)

(73) Assignee: FPInnovations, Pointe Claire, QC (CA)

( * ) Notice: Subject to any disclaimer, the term of this patent is extended or adjusted under 35 U.S.C. 154(b) by 0 days.

(21) Appl. No.: 13/221,103

(22) Filed: Aug. 30, 2011

(65) Prior Publication Data

US 2011/0308753 A1 Dec. 22, 2011

Related U.S. Application Data

(63) Continuation of application No. 12/155,496, filed on Jun. 5, 2008, now Pat. No. 8,025,768.

(60) Provisional application No. 60/929,038, filed on Jun. 8, 2007.

(51) Int. Cl.
*D21H 17/69* (2006.01)
*C08K 13/02* (2006.01)

(52) U.S. Cl. ............ 162/169; 162/158; 162/164.6; 162/168.2; 162/181.2; 162/181.3; 162/181.8; 162/185; 524/425; 524/447; 524/451; 524/556; 524/565; 428/407; 106/416; 106/465; 106/487; 106/499

(58) Field of Classification Search .... 162/168.1–168.7, 162/169, 181.1–181.9, 183, 158, 164.6, 164.7, 162/168.2, 185; 427/220, 221; 523/326, 523/333, 334, 335; 524/425, 436, 447, 451, 524/556, 562, 565; 428/407; 106/416, 465, 106/487, 499
See application file for complete search history.

(56) References Cited

U.S. PATENT DOCUMENTS

| | | | |
|---|---|---|---|
| 2,887,431 A | 5/1959 | Piersol ..................... 162/169 |
| 3,052,595 A | 9/1962 | Pye | |
| 4,115,187 A | 9/1978 | Davidson | |
| 4,121,966 A | 10/1978 | Amano et al. ............ 162/164.1 |
| 4,225,383 A | 9/1980 | McReynolds | |
| 4,246,066 A | 1/1981 | Amano et al. ................ 162/141 |
| 4,445,970 A | 5/1984 | Post et al. | |
| 4,710,270 A | 12/1987 | Sunden et al. | |
| 4,997,864 A * | 3/1991 | Waters .......................... 523/319 |
| 5,240,561 A | 8/1993 | Kaliski | |
| 5,250,153 A | 10/1993 | Izard et al. | |
| 5,454,864 A | 10/1995 | Whalen-Shaw ............ 106/416 |
| 5,514,212 A | 5/1996 | Kurrle | |
| 5,611,890 A | 3/1997 | Vinson et al. | |
| 5,616,384 A | 4/1997 | Goettmann et al. | |
| 5,851,352 A | 12/1998 | Vinson et al. | |
| 5,895,557 A | 4/1999 | Kronzer | |
| 6,080,802 A * | 6/2000 | Emmons et al. .............. 523/205 |
| 6,162,328 A | 12/2000 | Cenisio et al. | |
| 6,214,467 B1 * | 4/2001 | Edwards et al. ............. 428/407 |
| 6,379,497 B1 | 4/2002 | Sandstrom et al. | |
| 6,576,051 B2 * | 6/2003 | Bardman et al. ............. 106/436 |
| 7,074,845 B2 | 7/2006 | Laleg | |
| 2004/0054063 A1 * | 3/2004 | Brown et al. .................. 524/500 |
| 2008/0210394 A1 * | 9/2008 | Mahr et al. .................... 162/162 |

FOREIGN PATENT DOCUMENTS

| | | |
|---|---|---|
| GB | 1505641 | 3/1978 |
| GB | 2016498 | 9/1979 |
| JP | 57205597 | 12/1982 |
| JP | 58186699 | 10/1983 |
| WO | WO 2006128814 A1 * | 12/2006 |

OTHER PUBLICATIONS

Evans, D.B.; Drummond, D.K.; Koppelman, M.H. "PCC Fillers for Groundwood Papers", 1991 Papermakers Conference, TAPPI Proceedings, p. 321-330.

* cited by examiner

*Primary Examiner* — Richard Crispino
*Assistant Examiner* — Dennis Cordray
(74) *Attorney, Agent, or Firm* — Norton Rose Canada LLP

(57) ABSTRACT

A filler treatment process enhances the fixation of anionic latex on filler in a short time. Anionic polymer dispersions (latex) are added to papermaking filler slurries at ambient temperature and then mixed with water of temperature higher than the glass transition temperature ($T_g$) of the latex used. The anionic latexes applied by this process are totally and irreversibly fixed or bound onto the filler particles and the treated filler particle agglomerate to form an aggregated filler slurry which is stable over time. The latex-treated filler slurry can be added to papermaking furnishes at any point prior to the headbox of the paper machine or stored for later use. The latex-treated filler slurry improves filler retention, only slightly reduces sheet strength and improves sizing performance.

20 Claims, 23 Drawing Sheets

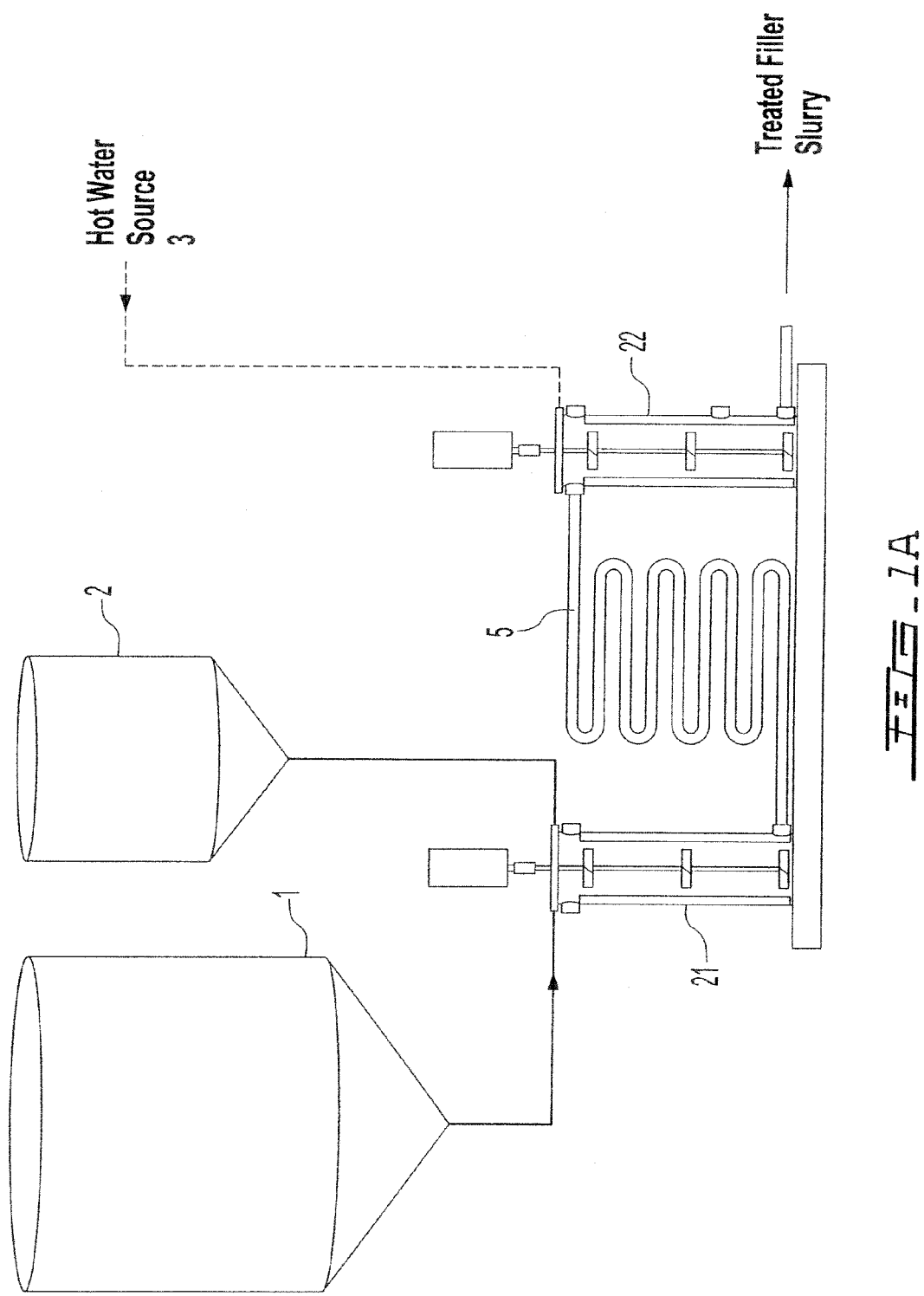

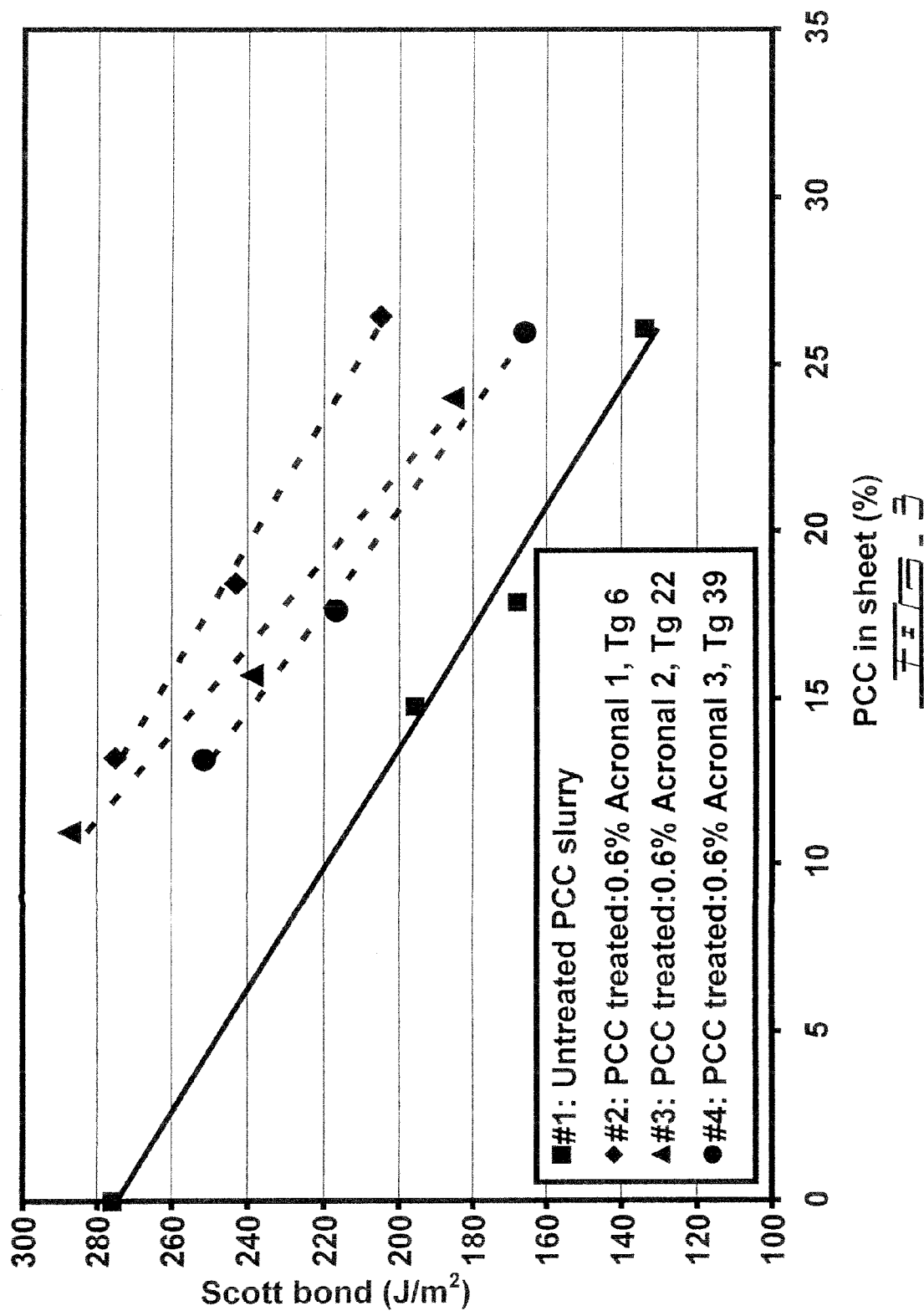

LATEX-TREATED FILLER SLURRIES FOR USE IN PAPERMAKING

CROSS-REFERENCE TO RELATED APPLICATIONS

This application is a continuation of U.S. Ser. No. 12/155,496, filed Jun. 5, 2008, now U.S. Pat. No. 8,025,768, issued Sep. 27, 2011, which is related to U.S. Provisional Application Ser. No. 60/929,038 filed Jun. 8, 2007 and the benefit under 35 USC119(e) of such US Provisional Application is claimed.

BACKGROUND OF THE INVENTION i) Field of the Invention

This invention relates to a filler treatment process, an aqueous filler composition and a treated filler, and a pulp furnish, all for use in paper manufacture; and to a method of making paper and to a paper.

ii) Description of the Prior Art

In the manufacture of filled paper and paperboard grades, filler slurries at consistencies ranging from 10 to 70% are added to pulp furnishes before the web forming section of the paper machine. The papermaker may also add other additives, such as a natural and synthetic polymeric strength agent, a sizing agent, alum, dyes, a fluorescent brightening agent and a retention aid system. The retention aid system is always added to the final furnish prior to the headbox to retain as much of the filler as possible in the sheet.

Filler contents up to 25% are typical of current papermaking where the filler improves the optical properties of the paper such as brightness and opacity as well as improving the feel of the sheet and the print quality of the printed sheet. In some instances, the economics of replacing expensive fibre with inexpensive filler lends added incentive to increase the amount of filler in paper. The savings can be substantial when low cost fillers, such as kaolin clay, precipitated calcium carbonate (PCC), ground calcium carbonate (GCC), chalk, talc, or precipitated calcium sulphate (PCS), are used to replace expensive pulp fibres. Moreover, filled paper is much easier to dry than paper with no filler and, as a result, the papermachine could run faster with less steam consumption, which reduces energy costs and improves productivity. Therefore, the replacement of a fraction of fibre by filler in paper could significantly reduce the production cost of paper.

For a given sheet grammage there are, however, limits to the amount of filler that can be added to the pulp furnish. The strength of paper and its printing properties (printability) are usually the most important factors limiting the filler content in paper, although other factors, such as papermachine runnability, retention, drainage, formation, dusting and sizing, are also a consideration.

In general, no matter how strong the pulp fibres and their bonding in paper is, all common fillers (e.g., clay, GCC, PCC, chalk, talc, PCS) are known to impair significantly all paper strength properties, including internal bond strength, surface strength, tensile, burst, tear, and stiffness. For example, it has been found that for each 1% filler addition to paper sheet the loss in tensile strength can range between 1 and 3%, depending on the type of pulp furnish. Sheet strength is inevitably reduced since a portion of fibres have been replaced by filler; not only because there are fewer fibres in the sheet, which reduces the number of fibre-fibre bonds, but also because the presence of the filler decreases the area of contact and prevents hydrogen bonding from occurring between the remaining pulp fibres. As a result, making a fibrous web with a high amount of filler produces a weaker sheet that can break more easily on the paper machine, size press, coater, winders and printing presses. Weaker fibre-fibre bonding also decreases the surface strength of the paper, causing a reduction in pick resistance and a tendency for increased linting. Poor bonding of filler particles in the fibrous structure, especially those located at the sheet surface, can increase dusting and piling in the pressroom and during converting.

Sizing chemicals, such as alkyl ketene dimer (AKD) and alkenyl succinic anhydride (ASA), are added to pulp furnishes in order to increase the hydrophobicity of the fibre and thus reduce water and liquid penetration into the sheet. In general, calcium carbonate fillers are known to increase the amount of sizing chemicals required for internal sizing paper. In particular, scalenohedral PCC, which is widely used in the manufacture of fine papers, produces excessive negative effects on sizing, which increases significantly the size chemical demand for maintaining target sizing value. As the content of PCC is increased in the furnish the demand for sizing chemicals is increased to maintain the desired degree of sizing or water repellency. Poor sizing efficiency and loss of sizing over time (size reversion) are common problems associated with the PCC-filled fine papers. Poor sizing affects liquid penetration and can be detrimental for coating and printing.

The retention of filler during web forming, even when assisted by retention aid chemicals, is often a major problem with all paper grades, especially for high speed machines and in the manufacture of light-weight and highly-filled grades. Since filler retention during sheet making is never 100%, as the filler content in pulp furnish is increased to 30-70% of the pulp fraction the filler concentration in the whitewater will significantly increase. In many paper mills machine runnability problems, paper defects, increased filler losses, and increased chemicals cost have been associated with high white water ash consistency. With common retention aid chemical systems it is possible to achieve high filler retention in paper by increasing the dosage of chemicals, but this is difficult to do without impairing web formation due to over-flocculation of furnish components. Therefore, a method that improves filler retention without excessive flocculation is required.

An ongoing industry trend is to decrease sheet grammage to reduce furnish costs. However, when the grammage is decreased nearly all paper properties deteriorate, including the limiting factors of opacity, stiffness and permeability. To overcome the loss in opacity due to basis weight reduction the papermaker can add expensive opaque pigments (e.g., titanium dioxide, calcined clay, sodium silicates or organic pigments) but this in turn can cause further deterioration in sheet strength. Reduction in grammage also decreases the retention of filler and increases the frequency of sheet breaks both on the paper machine and during converting and printing. Reducing sheet grammage may also lead to increased demand for sizing to control liquid absorbency.

A common method for improving the strength of filled paper and paperboard grades is the addition of high molecular weight polymers to pulp furnishes, such as cationic starches or cationic synthetic polymers. While the adsorption of a cationic polymer on naturally anionic pulp fibres can improve inter-fibre bond strength in paper, the presence of fillers will still cause de-bonding between fibres. Another limiting factor for the performance of cationic polymers is the presence of anionic dissolved and colloidal substances (DCS) in the furnish. These anionic DCS generally deactivate a large portion of the cationic polymer added making it less effective for bonding fibres. Anionic polymers can be used as a replacement for cationic polymers, but these polymers do not readily adsorb on anionic pulp fibres. To improve their retention on anionic fibres the addition of a cationic agent such as alum or synthetic polymer is required.

Mechanical pulp papers, including newsprint, groundwood specialties and supercalendered grades, have traditionally been made with clay fillers under acidic conditions. Although the addition of calcium carbonate fillers can improve the brightness and opacity of these papers at low cost, these fillers are still not widely used, because of the alkalinity of calcium carbonate. Mechanical pulp is usually weakly acidic, but if calcium carbonate is added to the pulp stock the pH will rapidly rise to above pH 8, causing the lignin in the mechanical pulp fibres to darken. The brightness drop of mechanical pulps due to a change in pH from 5 to 9 varied between 1.7 and 7.8 points, depending on the type and nature of pulp used [Evans, D. B., Drummond D. K., Koppelman M. H. "PCC fillers for groundwood papers". 1991 Papermakers Conference, TAPPI Proceedings, p 321-330]. Thus, to minimize darkening, paper made from mechanical pulp should suitably be made under slightly acidic (pH 6.5) or neutral conditions (pH 7.0). However, in the presence of acid, calcium carbonate dissolves to produce calcium ions and carbon dioxide gas. To apply calcium carbonate filler in wood-containing grades the calcium carbonate filler must remain stable under weakly acidic or neutral pH conditions. In recent years many paper mills making wood-containing grades have converted to neutral papermaking to allow the use of bright calcium carbonate fillers (GCC and PCC), but the stability of $CaCO_3$ filler at neutral pH and the amount of acid required to maintain neutral pH still remain major concerns. A method that makes calcium carbonate resistant to acid would allow mechanical pulp paper to be produced with PCC or GCC under neutral conditions.

The above information suggests that the paper industry needs cost-efficient technology for the production of highly-filled grades with good filler retention, drainage and formation, and acceptable strength, optical, and printing characteristics. A method that can make the filler particles adhere to themselves and to fibres without causing too much de-bonding between fibres may allow the papermaker to efficiently use polymers for strengthening filled papers. Furthermore, the filler should be stable at neutral pH so it can be used in the production of wood-containing grades.

In the industry, different water-based anionic polymer latex dispersions (such as styrene-butadiene, acrylate-styrene, acrylate-styrene-acrylonitrile, styrene-butadiene-acrylonitrile, acrylate-vinyl acetate) are added to various pigments in order to achieve many objectives, for example, in paint formulations where the latex increases storage stability and pigment compatibility. The use of polymer latex dispersions followed by water evaporation is a very convenient technique for obtaining uniform rubber films. The film formation process has three steps. First, the water evaporates, whereby the latex particles comes into contact with each other, then deformation of the latex spheres occurs and, finally, these deformed polymeric particles coalescence resulting in a uniform and continuous film. Furthermore, polymer latex dispersions are also widely used in paper coating formulations as a binder for fillers and pigments. The lower the glass transition temperature ($T_g$) of the latex the lower is the minimum film-forming temperature.

Anionic polymer latex dispersions do not readily adsorb on pulp fibres and, thus, are not used alone as paper making furnish additives. However, it is known in the paper industry that the addition of anionic latex followed by the addition of alum causes the latex particles to precipitate onto pulp fibres. Due to their small size and high surface areas the latex particles can cover a large surface area of pulp fibres. The presence of such latex in the paper sheet can act as a binder after drying and thereby give increased strength to paper and paper board products. Cationic polymer latex dispersions, which can readily adsorb on pulp fibres, are not commonly used as furnish additives probably due to their high cost.

Another approach for improving filler retention, strength and sizing performance is by treating the filler slurry with additives prior to mixing it with the pulp stock. For example, several patents, including U.S. Pat. No. 4,225,383, U.S. Pat. No. 4,115,187, U.S. Pat. No. 4,445,970, U.S. Pat. No. 5,514,212, GB 2,016,498, U.S. Pat. No. 4,710,270, and GB 1,505,641, describe the benefits of filler treatment with additives on retention and sheet properties. It is known that since most common inorganic filler particles in suspension carry a negative charge, the cationic additive adsorbs on their surfaces by electrostatic interactions causing them to agglomerate or flocculate. For anionic additives to promote flocculation the filler particles would require a positive charge to allow adsorption of the anionic additive. The aggregation of filler particles improves retention during sheet making and can also decrease the negative effect of filler on sheet strength, but excessive filler aggregation can impair uniformity and also decrease the gain in optical properties expected from the filler addition.

GB 1,505,641 discloses treating positively charged chalk whiting (natural ground calcium carbonate) with anionic styrene-butadiene (SB) latex dispersions. The filler particles are made cationic by the addition of the cationic starch with the objective to promote the adsorption of the anionic SB latex on the surfaces of filler particles. The preferred SB latex of GB 1,505,641 has at least 60% of its units derived from styrene. Treatment of cationic calcium carbonate filler, especially chalk whiting, with this SB latex is used to produce protected filler particles, which are then added during papermaking to improve the strength of the filled sheet. The latex-treated cationic chalk whiting slurry, containing up to 20 parts of latex per 100 parts of cationic chalk, is added before the headbox of the paper machine, for example, to the beater or pulper.

In U.S. Pat. No. 7,074,845B2 anionic latex has been used in combination with swollen starch for preparing treated filler slurries to be added internally in paper manufacture. The swollen starch/latex compositions are prepared by pre-mixing latex with a slurry of starch granules in a batch or jet cooker, or by adding hot water to the mixture under controlled conditions in order to make the starch granules swell sufficiently to improve their properties as a filler additive but avoid excess swelling leading to their rupture. The anionic latex interacts with cationic swollen starch granules forming a cross-linked starch structure. The cross-linked starch/latex composition is rapidly mixed with the filler slurry, which increased filler aggregation. The treated filler is then added to the papermaking furnish prior to sheet making. The treated filler prepared by this process was easily retained in the web during papermaking and the filled sheets have a higher internal bond and tensile strength than filled sheets produced using the conventional addition of cooked starch to the furnish.

At no point do any of the above patents disclose a method for the rapid and irreversible fixation of anionic polymer latex dispersions on filler induced by the addition of hot water at a temperature higher than the $T_g$ of the polymer latex used. Also, there are no references in the open or patent literature related to the continuous treatment of filler with latex, in which the filler slurry is mixed with the anionic latex in mixing vessels that can control the degree of latex fixation on the filler by simply blending it with hot water under controlled shear and mixing time.

SUMMARY OF THE INVENTION

It is an object of this invention to provide a process of treating a filler with an anionic latex, for use in papermaking.

It is a further object of this invention to provide an aqueous filler composition for use in papermaking.

It is a still further object of this invention to provide a treated filler, for use in papermaking.

In accordance with one aspect of the invention, there is provided a process of treating a filler comprising: forming a mixture of an aqueous filler slurry and an aqueous anionic latex, and mixing the mixture with hot water at a temperature higher than the Tg of the latex.

In accordance with another aspect of the invention, there is provided an aqueous filler composition comprising a filler with anionic latex resin fixed thereon, in an aqueous vehicle.

In accordance with still another aspect of the invention, there is provided a treated filler comprising a filler with anionic latex resin fixed thereon.

In accordance with yet another aspect of the invention, there is provided a pulp furnish comprising pulp fibres, and a filler with anionic latex resin fixed thereon, in an aqueous vehicle.

In accordance with still another aspect of the invention, there is provided in a method of making paper from a pulp furnish comprising pulp fibres and particulate filler in an aqueous vehicle, the improvement wherein said filler has anionic latex resin fixed thereon.

In accordance with yet another aspect of the invention, there is provided a paper product formed of pulp fibres and particulate filler, wherein the filler has anionic latex resin fixed thereon.

In accordance with the invention, there is provided a process for the continuous treatment of filler slurries with anionic latex whereby a complete fixation of latex on filler surfaces is achieved in a short time by adding hot water. The addition of the treated fillers to papermaking pulp furnishes improves retention and reduces the tendency of the filler to reduce paper strength and sizing. The latex-treated filler (e.g. $CaCO_3$) is also found to be useful in reducing the amount of acid consumption needed to maintain the furnish pH at neutral.

DESCRIPTION OF PREFERRED EMBODIMENTS

The present invention relates, in particular embodiments, to a continuous filler treatment process, in which anionic latex is added to filler slurries followed by the addition of hot water in an apparatus with mixing vessels that can control shear and mixing time for the rapid and complete fixation of latex on filler particles. The latex-treated filler slurries prepared using this novel process can be added to pulp suspensions used in the manufacture of filled wood-free papers, wood-containing papers and paperboard products. The filled products made with the latex-treated fillers have a superior quality compared to products made with untreated fillers.

The present invention provides a continuous process of preparing latex-treated filler slurries suitable for addition to pulp furnishes used in the manufacturing of paper and paperboard grades. The process comprises mechanical mixing a slurry of filler at ambient temperature with anionic polymer latex dispersions, such as n-butyl acrylate-styrene, n-butyl acrylate-acrylonitrile-styrene, styrene-butadiene-acrylonitrile and styrene-butadiene (SB) having a $T_g$ in the range of −3 to +50° C., followed by adding to the sheared mixture a volume of hot water, introduced so as to raise the mixture to a temperature higher than the $T_g$ of the latex used. The introduction of hot water to the mixture of filler/latex under controlled mixing conditions of shear and reaction time is substantial enough that all the latex material becomes bound to the surfaces of the filler material. Due to increased interparticle interactions the slurry viscosity increased and filler particles became aggregated. The turbidity of the aqueous medium of the treated filler slurry was clear indicating that all latex added was being adsorbed on filler particles. It has been found that the determining factors to achieve complete fixation of latex on filler are the chemical nature and $T_g$ of the latex used, and the temperature of the hot water.

This invention describes a method for the continuous production of filler slurries, which are treated by adding the anionic latex followed by mixing them with hot water. The freshly treated filler slurry is then introduced to a pulp fibre stock to form a furnish, and produce paper from said furnish. The enhanced fixation of latex on filler by the addition of hot water and the degree of particle aggregation are accomplished in mixing vessels under the controlled conditions of shear and agitation time. Using this process the total amount of latex added to the filler slurry at ambient temperature (which for a commercial papermaking process could be as high as 75 kg latex per ton of filler), is rapidly and irreversibly adsorbed onto the filler particles. The temperature of filler/latex mixture, which must be higher than the $T_g$ of the latex used, may vary between 30 and 90° C. Therefore, a lower $T_g$ polymer latex requires a lower hot water temperature to achieve the latex fixation onto filler. Generally, the hot water will have a temperature of 40° C. to 98° C. in order to raise the temperature of the filler/latex mixture and promote the fixing of the latex resin solids to the filler.

The preferred anionic polymer latex dispersions for maximum adsorption are n-butyl acrylate-styrene copolymers and n-butyl acrylate-acrylonitrile-styrene copolymers with $T_g$ values ranging from −3 to 50° C., particle sizes of 30 to 200 nm and viscosities measured at about 50% solids from 100 to 1000 cps.

The most preferred anionic polymer latex dispersions for this invention are those of $T_g$ values ranging from 4 to 39° C., particle sizes of 30 to 200 nm and viscosities measured at about 50% solids from 200 to 500 cps. However, other anionic acrylic polymer dispersions of smaller or larger particles may also be employed.

While the use of hot water was also found to be beneficial for enhancing the adsorption of other anionic polymer latex dispersions on fillers, such as low $T_g$ styrene-butadiene (SB) latexes, these resins were found to be less efficient for the purpose of the invention.

The preferred fillers for the addition of acrylic polymer dispersions are PCC, GCC, Kaolin clay, PCS and Talc. Filler slurries that are anionic (negatively charged) or contain an anionic dispersant might require the level of the negative charge to be neutralized by using synthetic cationic agents. The purpose of the cationic agent is to promote the initial adsorption of anionic resin on the filler surfaces prior to mixing with hot water for complete latex fixation.

The latex-treated filler slurries produced continuously by this invention can then be directly introduced into the pulp furnish at a point prior to or at the inlet of the headbox of the paper machine. Common papermaking additives can be added to the furnish containing the treated filler slurry to further enhance retention, strength and sizing. During the drying operation of the sheet made with treated filler slurries the particles of acrylic polymer dispersions adsorbed on the filler surfaces will deform and strongly bind the filler particles together and to the fibres, thereby reinforcing the paper composite and increasing its strength, hydrophobicity, porosity and smoothness.

The mechanism by which the introduction of hot water to the mixture of filler/acrylic polymer dispersions caused the latex to fix onto the filler particles and promote their aggregation is not fully understood, but scanning electron microscopy (SEM) analysis of freeze dried latex-treated PCC slurries prepared at different temperatures indicated that the latex was strongly adsorbed onto the surfaces of filler particles. In the SEM experiments a sample of acrylic polymer dispersion 200 nano-meters (nm) in size was mixed with a PCC slurry without dispersant (average filler particle size 1.3 micrometers, μm) at a consistency of 20% followed by addition of hot water. Due to their small size the particles of the acrylic polymer dispersions adsorb onto the larger filler particles by electrostatic or hydrophobic interactions. On adding the hot water to the filler/latex mixture at temperatures above the $T_g$ of latex, the latex is destabilized becoming more attractive toward filler particles, spreading well over their surfaces and causing them to aggregate. It has been found that the degree of latex adsorption caused by adding hot water is greatly dependent on the PCC slurry concentration and the $T_g$ of acrylic polymer dispersions. Acrylic polymer dispersions with low $T_g$ values have been found to have the highest adsorption affinity toward PCC particles. The adsorption of the anionic polymer dispersions onto PCC was also found to be more favourable with high consistency filler slurries.

When the filler slurry is treated using acrylic polymer dispersions according to this invention, and then added to a pulp stock, a retention aid system may be employed to induce filler adsorption onto the surfaces of the fines and fibres causing their retention during web forming. The retention aid systems can be a cationic starch, a cationic polyacrylamide, or their dual addition with anionic micro-particles, such as colloidal silica and bentonite. These additives are to be introduced into the papermaking furnish containing the treated filler slurry prior to the headbox and, preferably, at the inlet of the fan pump or the pressure screen of the paper machine.

An important aspect of the present invention is to fix anionic latex onto filler particles. Fixing acrylic polymer dispersions onto filler using hot water as described in this invention makes it possible to produce, with minimal strength loss and improved porosity, smoothness, and sizing filled papers, such as coated and uncoated fine papers, super-calendered papers, paperboard, and newsprint. Fillers treated according to the present invention can thus help papermakers producing filled paper and paperboard products to raise the filler content of the sheet without significantly sacrificing key product properties or increasing the cost of the sizing and retention aid chemicals. Another benefit of adding the latex-treated PCC slurry to mechanical pulp furnishes was that less acid was required to achieve and maintain a neutral pH while minimizing the dissolution of PCC.

According to the present invention the hot-water induced, rapid and irreversible fixation of acrylic polymer latex dispersions onto filler can be used for treating a single filler slurry or blended filler slurries at their commercial consistencies, i.e., with no further dilution needed prior to treatment. It was surprising to find that adding hot water to the filler slurry, especially PCC, which was pre-mixed with acrylic polymer dispersions at room temperature under mechanical agitation, induced a complete and irreversible fixation of the latex onto the filler surfaces causing them to aggregate. The preparation of treated filler slurries using the process of this invention has not been previously disclosed.

BRIEF DESCRIPTION OF DRAWINGS

FIGS. 1a and 1b illustrate schematically apparatus for preparing treated fillers in accordance with the invention;

FIGS. 2 to 14 illustrate various characteristics exhibited by treated fillers of the invention;

FIGS. 2c and 2d illustrate graphically filtrate turbidity of PCC slurries treated in accordance with the invention;

FIGS. 2e, 2f and 2g illustrate graphically filtrate turbidity of a PCC slurry treated at different latex levels and water at different temperatures;

FIG. 3 illustrates graphically internal bond strength (Scott bond) of paper sheets with different levels of untreated and treated filler;

FIG. 4 illustrates graphically porosity of paper sheets with different levels of untreated and treated filler;

FIGS. 5 and 6 illustrate graphically internal bond strength of paper sheets made employing untreated and treated filler;

FIG. 7 illustrates graphically the internal bond strength of paper sheets made employing untreated and treated filler;

FIG. 8 illustrates graphically the breaking length of paper sheets made employing untreated and treated filler;

FIG. 9 illustrates graphically the internal bond strength of paper sheets made employing untreated and treated filler;

FIG. 10 illustrates graphically the breaking length of paper sheets made employing untreated and treated filler;

FIG. 11 illustrates graphically internal bond strength of paper sheets made employing untreated and treated filler;

FIG. 12 illustrates graphically PPS porosity of paper sheets made employing untreated and treated filler; and FIGS. 13 and 14 show values of HST (Hercules Sizing Test) of paper sheets made employing untreated and treated filler.

DETAILED DESCRIPTION OF THE INVENTION WITH REFERENCE TO THE DRAWINGS

Figure 1B:
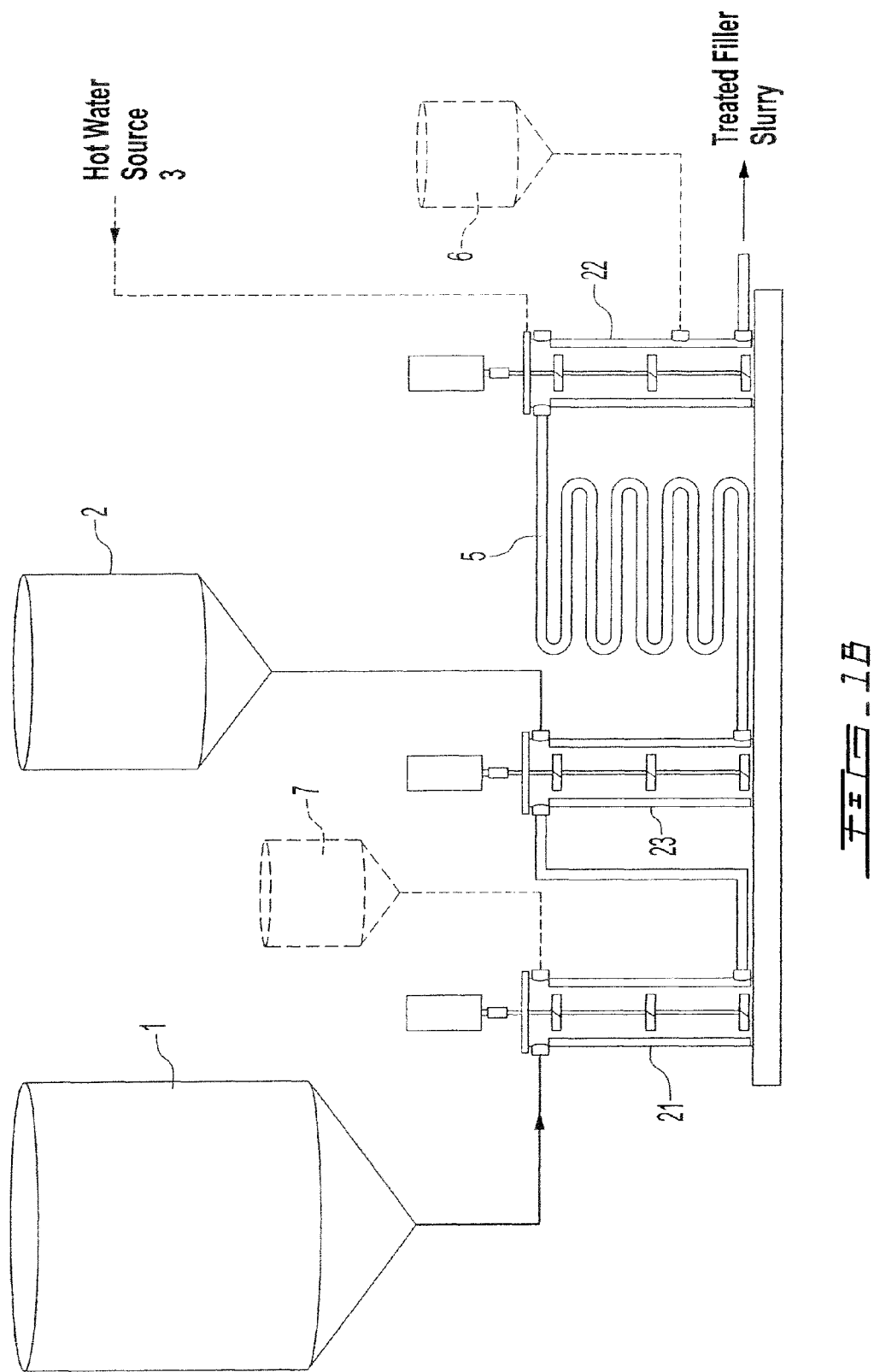

FIGS. 1a and 1b schematically illustrate an apparatus or unit for preparing treated filler slurries using acrylic resin dispersions and hot water, for addition to papermaking furnishes. FIG. 1a shows a simple system for treating filler slurries made without an anionic dispersant, whereas FIG. 1b presents a system for treating filler slurries that may contain anionic dispersants.

Figure 1C:
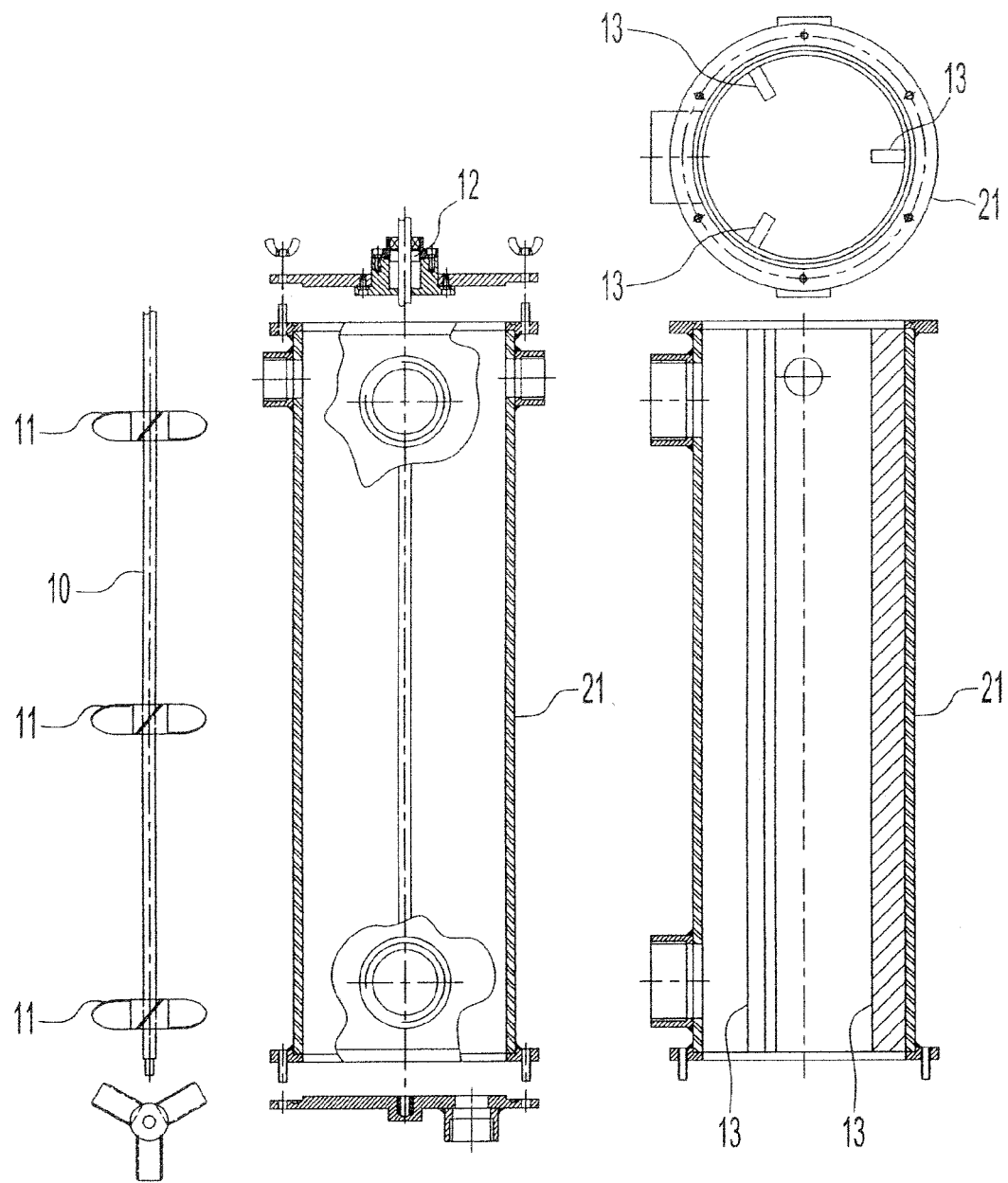
FIG. 1c illustrates schematically a mixing vessel for use in the apparatus of FIGS. 1a and 1b.

FIG. 1c describes the interior of a mixing vessel and its agitator. While other mixing means, including inline static mixers, high shear mixers or a centrifugal pump, such as that described in U.S. Pat. No. 4,799,964, can be used for treating filler slurries with anionic latex, the mixing vessels described in FIG. 1 are the best suited for this invention.

Key to FIG. 1a:
filler slurry tank 1
latex tank 2
hot water source 3
mixing vessels 21 and 22
insulated hard pipe 5 for extended contact
Key to FIG. 1b:
filler slurry tank 1 latex tank 2
hot water source 3
mixing vessels 21, 22 and 23
insulated hard pipe 5 for extended contact
co-additive tank 6
co-additive tank 7
Key to FIG. 1*c*:
shaft 10 having three impellers 11
interior of mixing vessel 21 showing the mechanical seal 12
interior of mixing vessel 21 showing the baffles 13
three baffles 13 of mixing vessel 21

FIGS. 2 to 14 show information concerning the adsorption of latex onto filler and comparisons of the internal bond strength (Scott bond), tensile strength (breaking length), porosity (PPS porosity) and sizing value (HST) of sheets filled with PCC produced using the conventional process (no filler treatment) and PCC treated with acrylic polymer dispersions using the process of our invention.

The unique method of this invention involves using hot water during the continuous treatment of filler slurry with acrylic polymer dispersions in mixing vessels. With reference to FIG. 1*a*, pre-mixing latex with filler slurries made with no dispersant takes place in mixing vessel 21. Filler slurry and latex are metered from tanks 1 and 2, respectively, into mixing vessel 21 which has an agitation rate set at 100 to 600 rpm. The filler/latex mixture is delivered through pipe 5 to mixing vessel 22 and is then mixed in vessel 22 with metered hot water of a known temperature from source 3, to achieve the desired slurry consistency and temperature. Mixing vessel 22 may be of the same form as mixing vessel 21 in FIG. 1*c*. Referring to FIG. 1*b* mixing vessel 21 may be used for pre-treating filler slurry from tank 1 with a co-additive from tank 7, namely a synthetic cationic agent, in order to add cationic sites on filler particles or to neutralize anionic surfactant in the filler slurry and initiate the initial adsorption of the anionic latex onto the filler prior to the addition of hot water. The resulting pre-treated filler slurry is delivered to vessel 23 where it is mixed with latex from tank 2, as described for FIG. 1*a*. Mixing vessels 22 and 23 may be of the same form as mixing vessel 21 in FIG. 1*c*.

The resulting filler/latex mixture is fed through pipes, as in FIG. 1*a*, to mixing vessel 22 for mixing with hot water from source 3. Co-additives may optionally be introduced to the mixture in vessel 22, from tank 6. The resulting treated slurry is received from vessel 22.

The commercial acrylic polymer dispersions are added as received (40-50% solids) to filler slurries. The consistency of the filler slurries, which depends on the type of filler used, may range from 10 to 70% solids. In paper mills the ambient temperature of filler slurries may vary between 20 and 25° C., however, depending on the season and mill storage system the temperature can be as low as 10° C. or as high as 30° C. In some mills, where the filler is produced on site, for example the PCC satellite plant, the temperature of the PCC slurry can reach as high as 40° C.

In the invention process, the filler/latex blend is mixed with a volume of hot water to achieve a slurry temperature greater than the $T_g$ of the latex. All mixing vessels are equipped with controlled mechanical agitation and temperature and pressure measurement devices. The volume of the mixing vessels may suitably range from 10 to 100 litres, depending on the flow level of the filler slurry. The interior design of the mixing vessels was specifically made to achieve the appropriate shear levels for optimally mixing the latex with the filler particles in the shortest time. Independent of the latex and hot water temperature good mixing of the filler/latex mixture is necessary to complete adsorption of the anionic latex on filler particles. The minimum mixing time for the latex with the filler slurry before adding the hot water is 1 to 10 seconds, but preferably 10 to 60 seconds. The minimum mixing time after introducing the hot water is 1 to 10 seconds, but preferably 60 seconds. The mixing time for the filler slurry with latex can be controlled by increasing the size of the treatment vessels and/or by way of the installation of the insulated hard pipe line 5 following the treatment vessel 21 (FIG. 1*a*) and vessel 23 (FIG. 1*b*).

The required hot water temperature and mixing time for preparing the treated filler slurry for complete latex fixation depend on the type of acrylic polymer dispersion used (its polymer composition, mean particle size and anionic surfactant used in its manufacture) and its $T_g$ as well as the initial temperature and consistency of the filler slurry. The preferred acrylic polymer dispersions have $T_g$ values ranging between −3 and 50° C. and a particle size between 30 to 200 nm. The consistency of common filler slurries may range between 10 and 70% solids. It has been found that latex adsorption is more favourable with high consistency filler slurries.

When acrylic polymer dispersion is mixed with the filler slurry the colloidal resin particles do not coagulate among themselves, but immediately start to adsorb onto filler particles causing the slurry viscosity to increase. Upon adding hot water to the filler/latex mixture the resin rapidly becomes strongly adhered to the filler particles causing the filler to aggregate. The turbidity of the filtrate or supernatant water extracted from the diluted treated filler slurry has a value close to zero suggesting that colloidal resin particles are well retained on filler particles. The adsorbed latex is not removed or desorbed from the filler particles during mixing over longer periods even under high shear. The level of complete latex adsorption induced by hot water can be as high as 100 kg of resin per ton of filler, especially for PCC made without a dispersant. Unlike aggregation achieved with polymeric flocculants, which is shear and time dependent, aggregation induced by acrylic polymer dispersions combined with the use of hot water is more shear/time resistant.

While the fixation of acrylic polymer dispersions according to this invention is complete when used with PCC or other fillers made without anionic dispersants, for filler slurries made with a high level of anionic dispersant (such as GCC and some kaolin clay slurries, talc) cationic agents, such as polyethylenimine and poly(dadmac), may also be pre-mixed with these fillers to neutralize the anionic dispersant and initiate the fixation of anionic latex onto their surfaces before adding hot water.

The latex-treated filler slurries made according to this invention can be directly introduced into the paper machine pulp stock prior to the sheet forming process, i.e., at the blend chest, machine chest, or inlet of the fan pump. To enhance filler retention a conventional retention aid system, preferably a cationic starch or cationic polyacrylamide used in conjunction with an anionic micro-polymer or silica, can be added to the furnish (comprising the pulp and treated filler), preferably at a point prior to or at the headbox or pressure screen.

Anionic acrylic polymer dispersions: These colloidal acrylic polymer dispersions are usually produced by the emulsion polymerization of the appropriate monomers, for example styrene, butadiene, acrylate, acrylonitrile, n-butyl acrylate. Different combinations of these monomers are added in different proportions to achieve the desired polymer latex. These colloidal acrylic polymer dispersions are usually produced by the emulsion polymerization of the appropriate monomers in the presence of a surfactant, such as sodium acrylamido stearate (NaAMS, $CH_2=CH-CONH-CH$

[(CH$_2$)$_8$—CH$_3$]-[(CH$_2$)$_8$—COO]—Na$^+$) and/or sodium styrene dodecyl sulfonate ether (SSDSE, CH$_2$=CH—C$_6$H$_4$—O(CH$_2$)$_{12}$—SO$_3$—Na$^+$). The surfactant imparts a negative charge originating from carboxylic or sulphonic groups. The purpose of using surfactant to manufacture latex is to control the nucleation, produce the desired latex particle size and maintain stability. The surfactant molecules bound to the latex particles are in dynamic equilibrium with other identical molecules that remain in the dispersion medium. If the conditions of this equilibrium are modified, for example under high shear stress and heat, the surfactant molecules are susceptible to migrate. Such migration can lead to destabilisation of the dispersion.

The preferred anionic acrylic polymer dispersions of this invention include those made by BASF under the trade marks Acronal and Styronal, namely n-butyl acrylate-acrylonitrile-styrene copolymers, n-butyl acrylate-styrene copolymers, and styrene-butadiene-acrylonitrile. The most preferred anionic latexes are Acronal products namely n-butyl acrylate-acrylonitrile-styrene copolymers, n-butyl acrylate-styrene copolymers. These anionic acrylic polymer dispersions are made with different proportions of styrene, n-butyl acrylate, acrylonitrile and styrene as well as surfactant. The preferred acrylic polymer dispersions contain about 15% by weight of units derived from styrene. The % weights of n-butyl acrylate and acrylonitrile are varied to achieve the desired characteristics (of T$_g$ and particle size). The level of surfactant in the acrylic polymer dispersions can also be different. The preferred T$_g$ of the acrylic polymer dispersions used for this invention varies between −3 and 50° C. and their average particle size ranges between 30 to 200 nm, for example 60 to 200 nm.

Tables 1 and 2 present the T$_g$ and mean particle size of some commercial and laboratory samples of acrylic polymer dispersions (45 to 50% solids.) The Zeta potential of these latexes ranged between −37 and −43 my, and their Brookfield viscosity ranged from 200 to 450 cps.

TABLE 1

Characteristics of commercial acrylic polymer dispersions

| Resin | Chemistry | T$_g$, ° C. | Mean particle size, nm |
|---|---|---|---|
| #1 | n-butyl acrylate-styrene-acrylonitrile copolymer | 6 | 190 |
| #2 | n-butyl acrylate-styrene copolymer | 22 | 150 |
| #3 | n-butyl acrylate-styrene-acrylonitrile copolymer | 39 | 150 |
| #4 | n-butyl acrylate-styrene copolymer | 49 | 30 |

TABLE 2

Characteristics of laboratory acrylic polymer dispersions

| Resin | Chemistry | Tg, ° C. | Mean particle size, nm |
|---|---|---|---|
| #5 | n-butyl acrylate-styrene-acrylonitrile copolymer | 6 | 200 |
| #6 | n-butyl acrylate-styrene-acrylonitrile copolymer | 23 | 140 |
| #7 | n-butyl acrylate-styrene-acrylonitrile copolymer | 6 | 140 |

Fillers: The fillers in this invention are typically inorganic materials having an average particle size ranging from 0.1 to 30 μM, more typically 1 to 10 μm, such as the common papermaking fillers like kaolin clay, ground calcium carbonate (GCC), PCC, PCS, talc, and their blends. The preferred fillers are those made with or without a low level of anionic dispersant. The most preferred inorganic fillers for use with acrylic polymer dispersions are those fillers supplied or prepared at the mill site without anionic dispersants, such as PCC, PCS, and Kaolin clay.

Dosage rate of anionic acrylic polymer dispersions: The relative dosage of acrylic polymer dispersion to the filler slurry is governed by the requirement that essentially all the resin particles become bound to filler particles upon the addition of hot water. Depending on the papermaking application the dosage rate of latex to the filler can vary from 1 to 100 kg/ton or more (based on a dry weight latex and filler), but the most preferred resin dosage varies from 5 to 50 kg/ton of filler.

The latex-treated filler slurry made by this invention process can be added to the pulp stock at any point in the pulp line before the headbox. The furnish (pulp plus latex-treated filler) is then used to manufacture paper by conventional papermaking techniques, i.e., a wet web is formed from the furnish and then drained, pressed, dried and, eventually, calendered. The amount of latex-treated filler blended with the pulp may be as high as 80% by weight of the total solids in the pulp, depending on the target filler content in the paper sheet.

Pulp Furnish: The papermaking pulp slurry or furnish to which the treated filler is to be added, in accordance with this invention, can be composed of mechanical, chemical, or recycled pulp and their mixtures. These pulp furnishes are commonly used in the manufacture of printing papers and paperboards. Thus, the terms "paper and paperboard" are used herein in a broad and general sense to denote a field of use and encompass all conventional paper and board type products in which the conventional paper fillers have been employed.

Papermaking Chemicals: The latex-filler slurries of this invention may be added to papermaking furnishes to which are normally added conventional papermaking chemicals, like sizing agents, such as alkylketene dimer, alkenyl succinic anhydride, and rosin, wet strength agents, dyes, optical brightening agent (OBA), and cationic or anionic polymeric retention aids. A retention aid system, which may be a single chemical such as cationic polyacrylamide, anionic polyacrylamide, or cationic starch, or a dual chemical system (e.g., cationic polymer and anionic micro-particle or cationic polymer and anionic polymer) is generally added to improve retention.

EXAMPLES

The method of this invention can be best described and understood by the following illustrative examples. In these examples, the results were obtained using laboratory scale techniques. The Scanning Electron Microscope (SEM) and turbidity procedures were used to investigate the latex adsorption on filler. For sheet making the basic procedure consists of adding an amount of the filler slurry (untreated or latex-treated) to a pulp furnish at 50° C. under mixing. After mixing for 1 minute the retention aid is added, then sheet making is carried out. Paper sheets (60 and 70 g/m$^2$) were prepared at 50° C. using a laboratory handsheet machine under controlled shear. After formation the moist webs were pressed on a laboratory roll press to about 40% solids and dried on a rotary dryer at 95° C. Prior to testing, the dried sheets were conditioned at 50% relative humidity and 22° C. for 24 hours.

In the subsequent examples the treated filler slurries were prepared as follows. Acrylic polymer dispersions at about 50% solids and room temperature (RT=22° C.) were added to the PCC slurry (20% solids) at RT under gentle mechanical agitation. To the agitated PCC/latex mixture a volume of water of a given temperature was then added to achieve a temperature higher than the $T_g$ of the acrylic polymer dispersions used. For instance, for latexes of Tg ranging between 6 and 49° C. water temperatures were chosen to give the PCC/latex mixture a temperature in the range of 6 to 80° C. In some experiments the latex-treated PCC slurry was then rapidly used to measure change in turbidity. In other experiments the latex-treated filler was also rapidly added to the pulp suspensions at 50° C. with mixing prior to carrying out handsheet making. In some other experiments the PCC slurry was first heated to 50° C. prior to the addition of latex. The introduction of acrylic polymer dispersions having a temperature of 22° C. reduced this pre-heated PCC slurry temperature to 41° C.

The effect of PCC treatment with Acronal latex (acrylic polymer dispersions) on AKD sizing performance was also evaluated.

The typical pulp furnishes used throughout these examples were composed of 70-80% BHKP (bleached hardwood kraft pulp, CSF 370 mL) and 20-30% BSKP (bleached softwood kraft pulp), both obtained from Canadian fine paper mills. The PCC slurry (Albacar HO, scalenohedral structure) used throughout these examples had a solids content of 20% and the particle size of the filler was 1.6 µm, and was obtained from Specialty Minerals Inc. Albacar HO is a trade-mark for precipitated calcium carbonate.

Except where indicated otherwise, the amounts of additives either introduced to the filler or pulp furnish are expressed as % or kg/ton and are to be understood as % or kg/ton by the weight of paper production.

Example 1

Figure 2A:
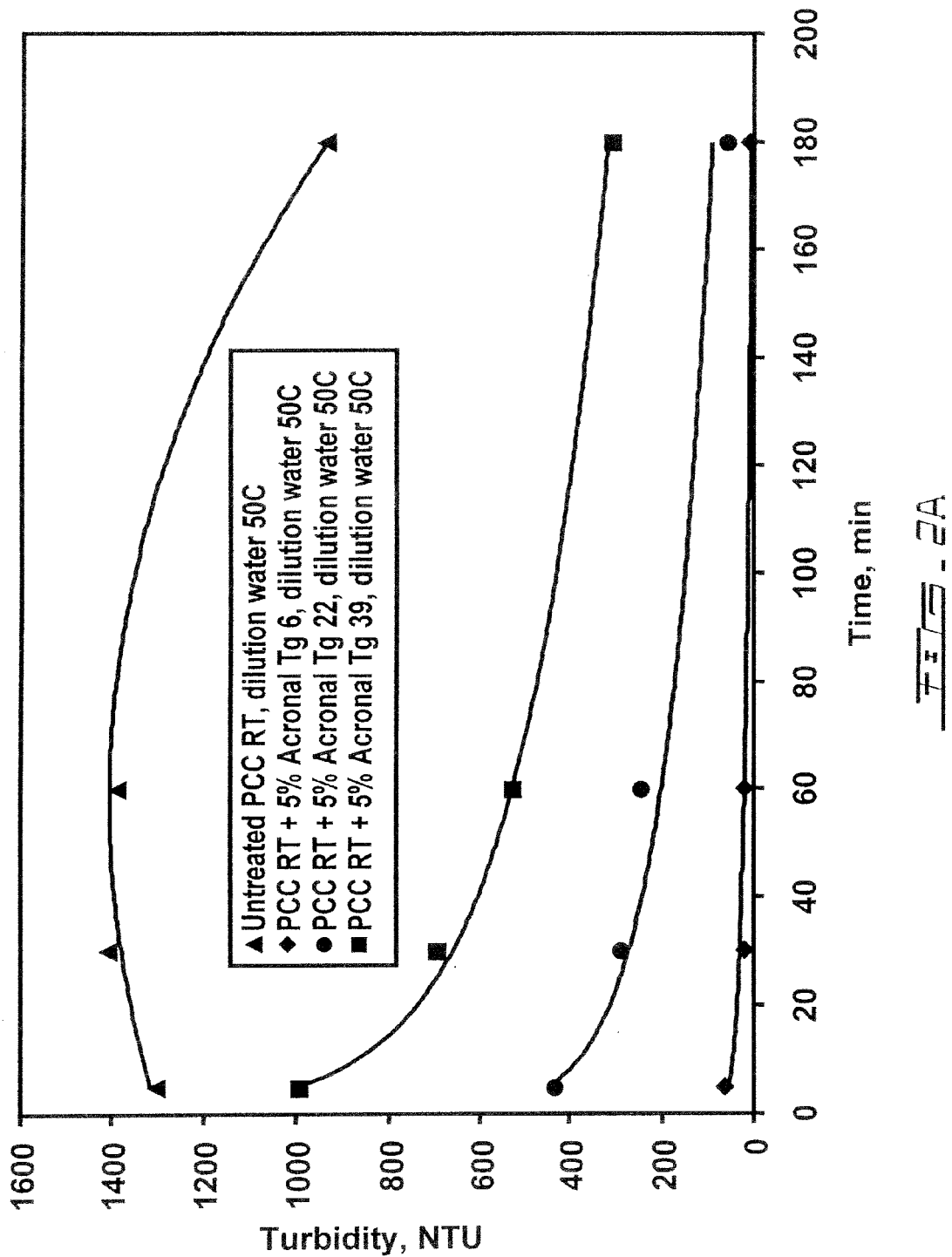
FIGS. 2a and 2b illustrate graphically filtrate turbidity of PCC slurries treated with different anionic dispersions.
Figure 2B:
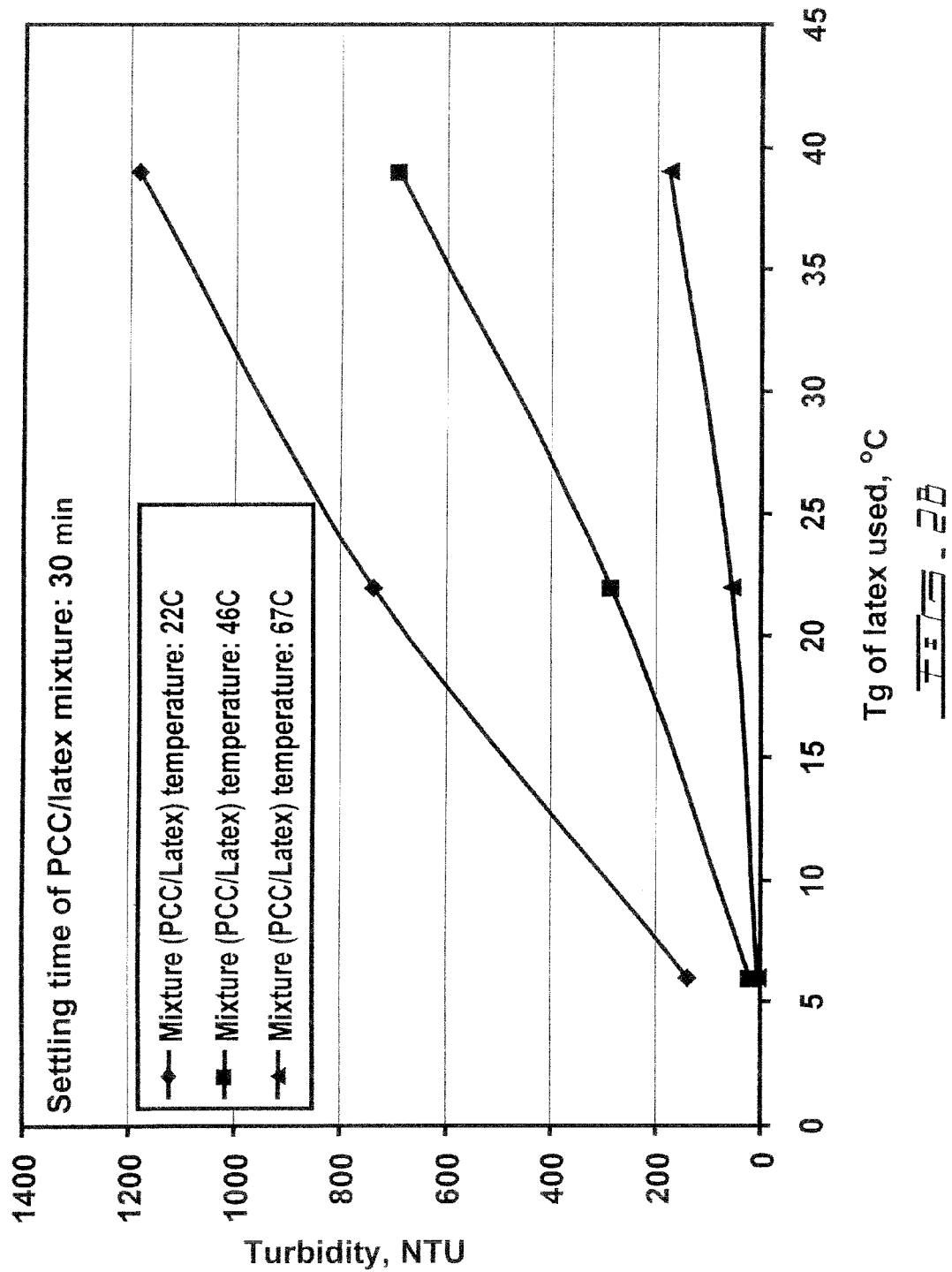

FIGS. 2a and 2b show the filtrate turbidity of PCC slurries treated with three acrylic polymer dispersions of different $T_g$ values (resins #1, #2 and #3 of Table 1) each used at three added water temperatures. The latex at room temperature (RT) (22° C.) was added to the PCC slurry (50 kg latex/ton filler) at RT and 600 rpm. The mixture was divided into three samples: the first sample was mixed with water at 22° C., the second sample was mixed with 50° C. water and the third sample was mixed with 80° C. water to obtain samples with 10% consistency. The temperature of the samples was 22, 38 and 47° C., respectively. The samples were further diluted to 2% with the corresponding hot waters to measure turbidity of the supernatant filtrate. The equivalent temperatures of the 2% slurries were 22, 46, 67° C., respectively. The turbidity of the supernatant of the diluted samples was recorded over time. The effect of diluting the untreated PCC slurry with water of different temperatures was also investigated for comparison purposes. The results of FIG. 2a for samples mixed with 50° C. water clearly show that the lower the lower the Tg of the Acronal latex the lower the turbidity of the PCC filtrate. FIG. 2b shows that for each latex the lower the $T_g$ of latex and the higher the water temperature used for diluting the PCC/latex mixture the clearer the mixture filtrate. The PCC particles of low turbidity samples were also well aggregated. These results demonstrate that for each latex the higher the dilution water temperature was the faster the particles agglomeration and the greater was the drop in turbidity. The turbidity of untreated PCC was not affected by the temperature of dilution water. Low turbidity values measured on PCC samples treated with latex using high dilution water temperatures (FIG. 2c) correspond to the efficient adsorption of latex on filler and enhanced particle aggregation.

Figure 2C:
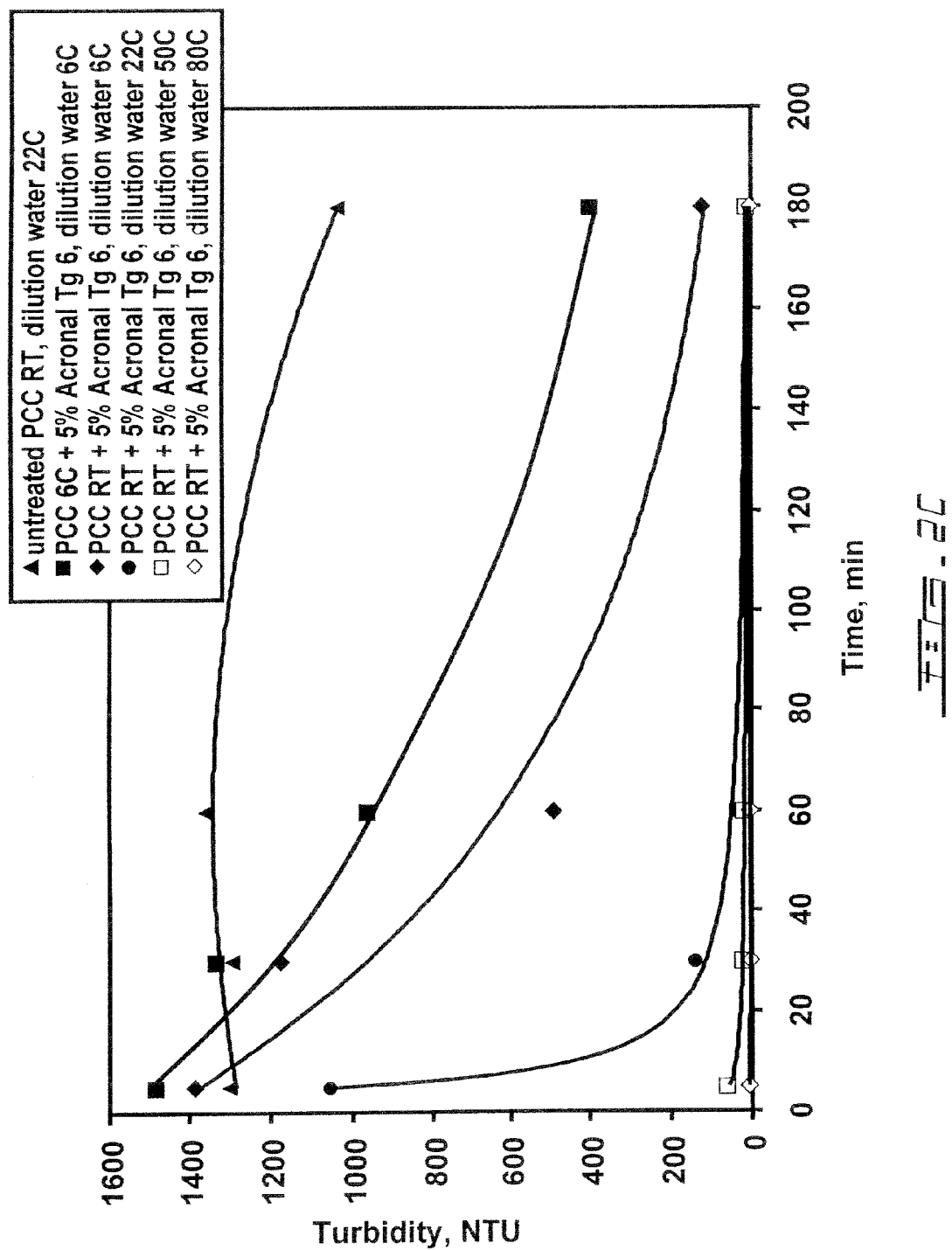
Figure 20:
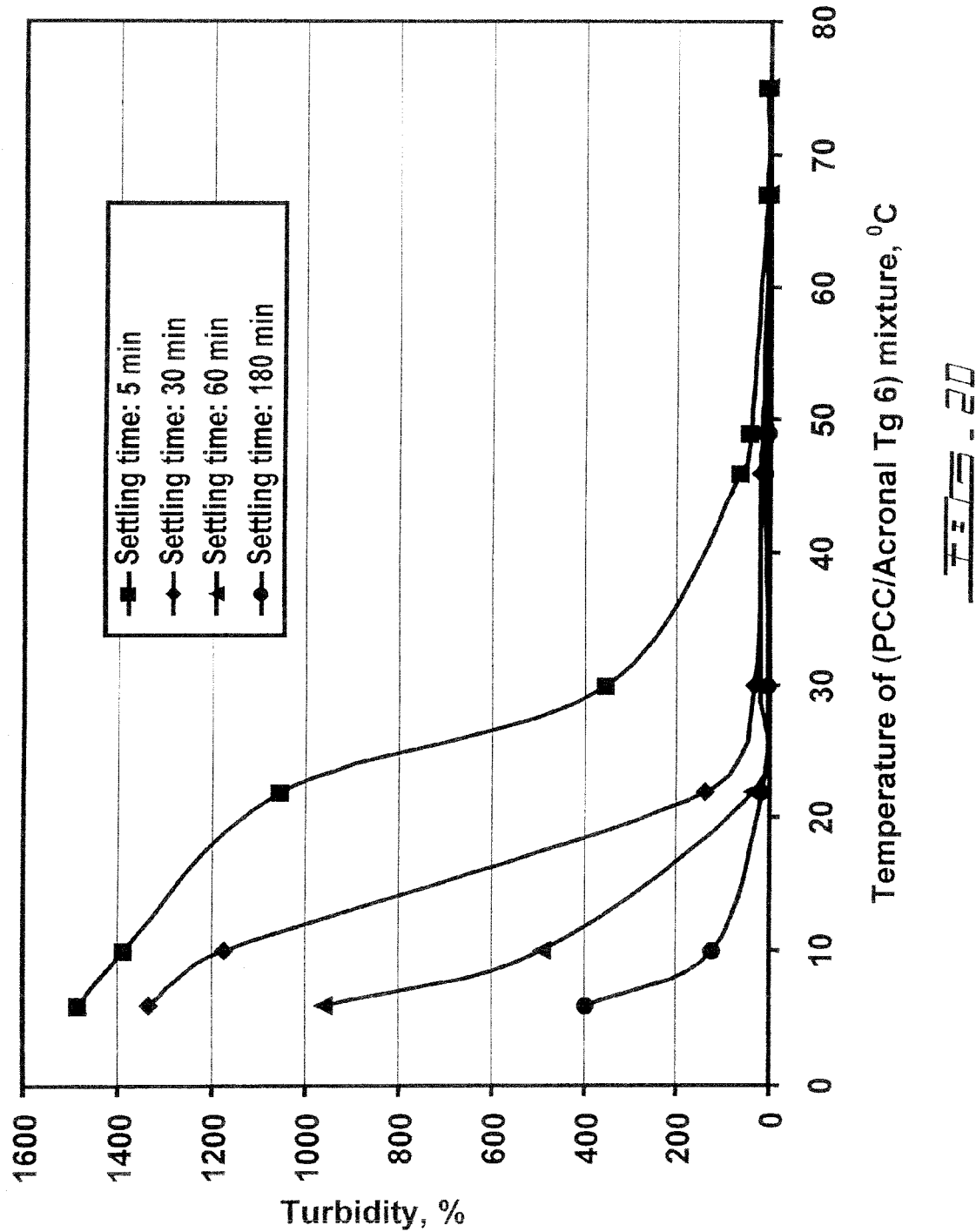

FIGS. 2c and 2d show the filtrate turbidity of PCC slurries treated with Acronal latex of $T_g$ 6 (resin #1) using dilution water at different temperatures, namely 6, 22, 50 and 80° C. The latex was added to the PCC slurry (50 kg latex/ton filler) at RT and 600 rpm. The mixture was divided into four samples: the first sample was mixed with water at 6° C., the second sample was mixed with 22° C. water and the third and fourth samples were mixed with 50 and 80° C. water to obtain samples with 10% consistency. The temperature of the samples was 13, 22, 38 and 47° C., respectively. The samples were further diluted to 2% with the corresponding hot waters to measure turbidity. The equivalent temperatures of the 2% slurries were 8, 22, 46, and 67° C., respectively. The turbidity of the filtrate of the diluted samples was recorded over time. The effect of diluting the untreated PCC slurry with water of different temperatures was also investigated for comparison purposes. One PCC sample was cooled to 6° C. prior to the addition of latex then the mixture was diluted to 10%, then 2% using water at 6° C. The results clearly show that the lower the water temperature used for diluting the PCC/latex mixture the less efficient latex adsorption was as indicated by the high turbidity values and the poor particle aggregation. The faster agglomeration and the greater drop in filtrate turbidity were measured with dilution temperatures much higher than the $T_g$ of the latex. For instance, for each latex the required mixture (PCC/latex) temperature for complete fixation and particles agglomeration must be 35-60° C. higher than the $T_g$ of the latex used.

Figure 2E:
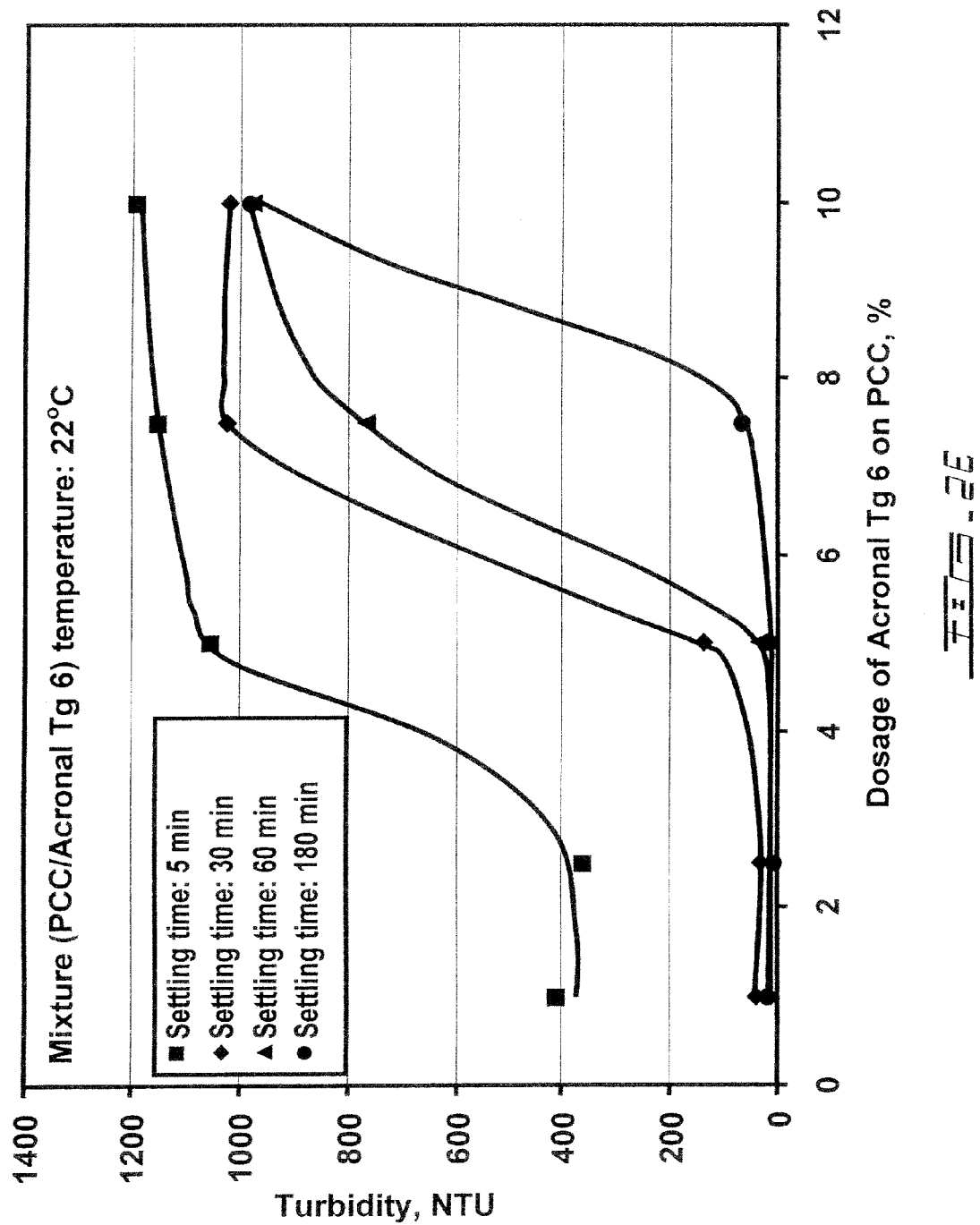
Figure 2F:
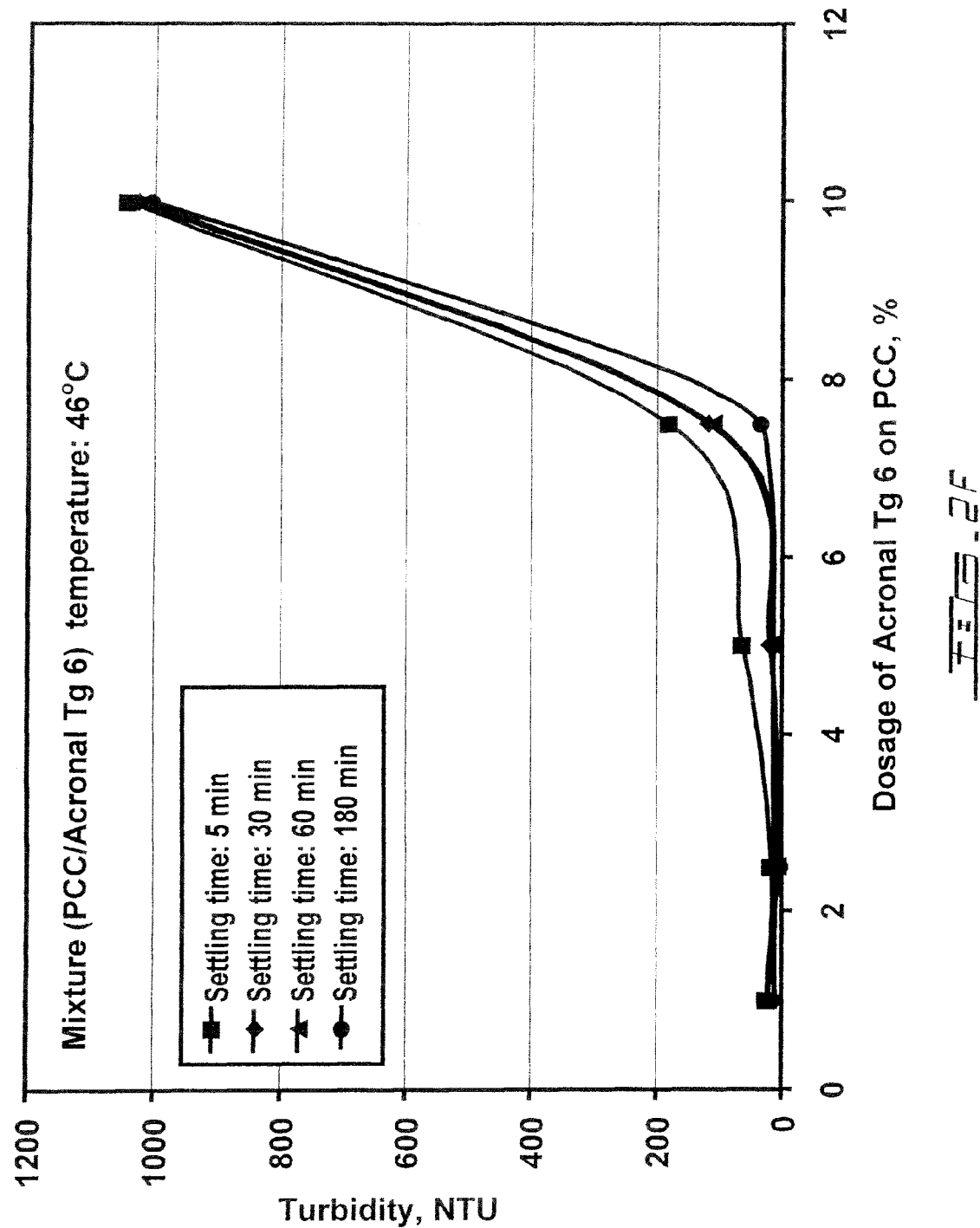
Figure 26:
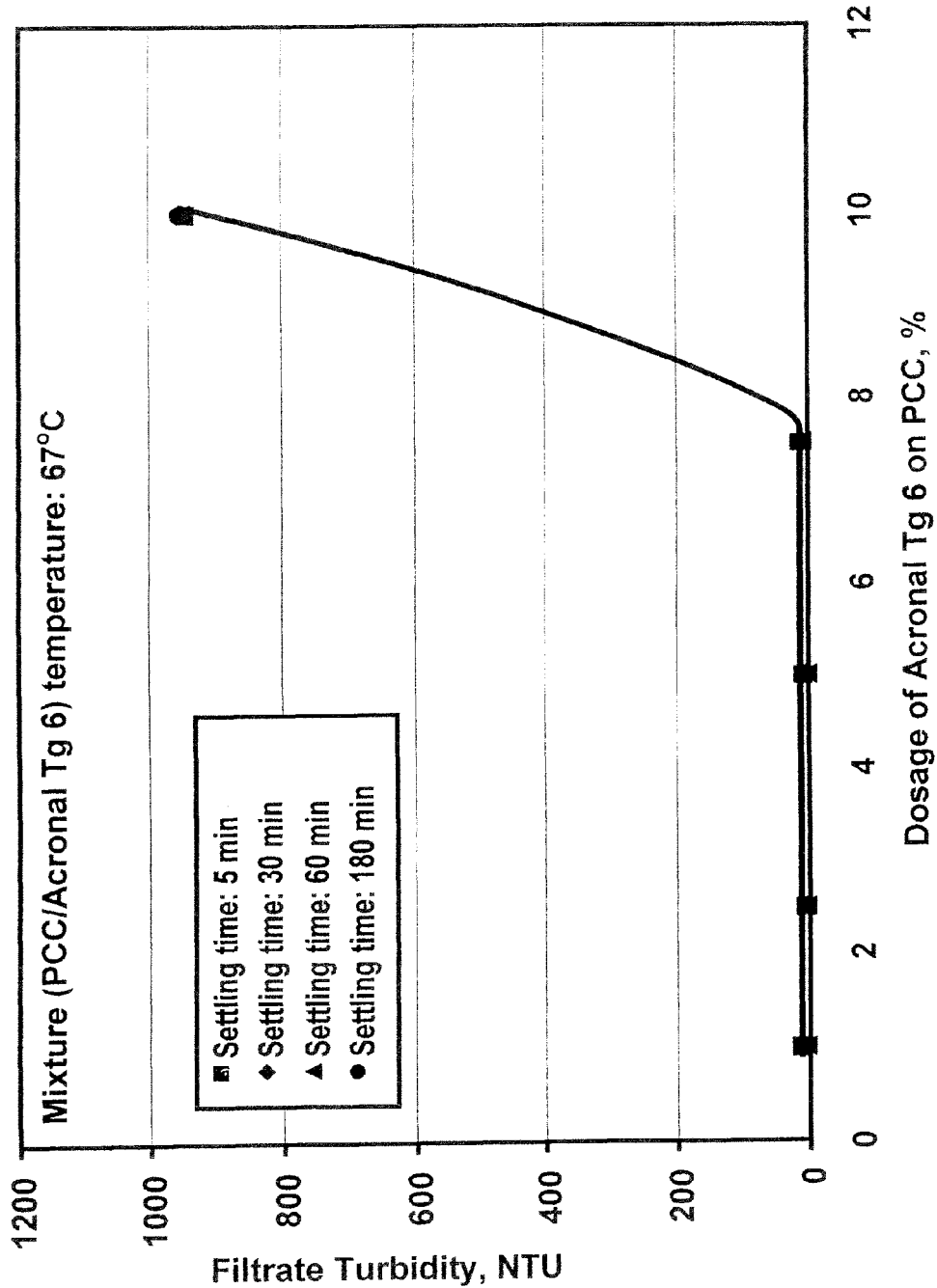

FIGS. 2e, 2f, 2g show the filtrate turbidity of a PCC slurry at RT treated with four addition levels of Acronal latex of $T_g$ 6 (resin #1) followed by the addition of 22, 50 and 80° C. water. The results show that at room temperature for dosage rates up to 50 kg latex/ton filler of PCC it requires up to 60 min sample settling for the turbidity to drop close to 5 NTU. However, at the treatment temperatures 50 and 80° C. the turbidity of samples made with up to 75 kg latex/ton filler rapidly dropped close to zero suggesting that all added latex was adsorbed onto PCC.

Figure 2H:
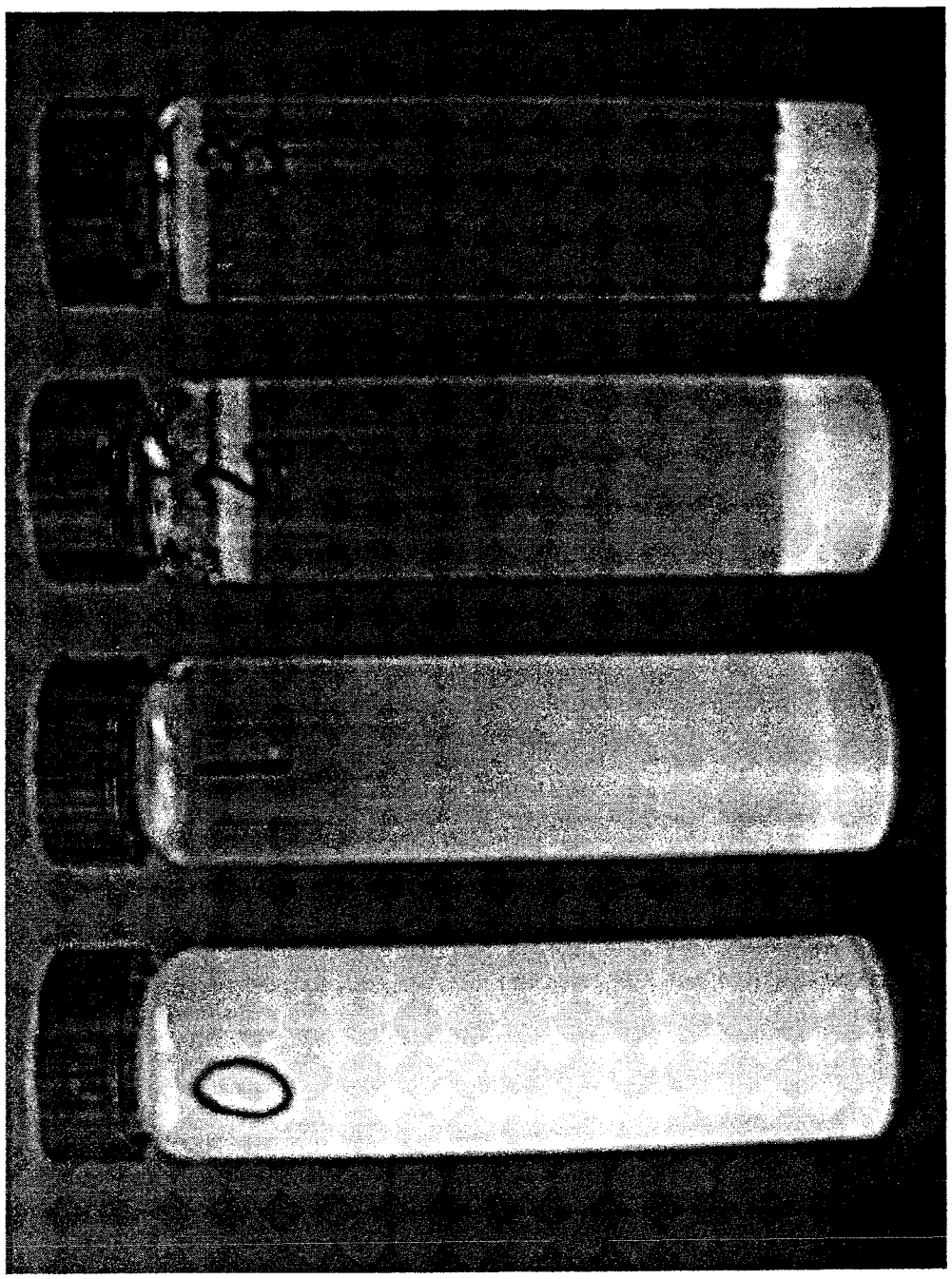
FIG. 2h illustrates photographically untreated filler slurries and treated filler slurries.

FIG. 2h shows a photograph of 2% slurries of untreated PCC and PCC treated with 5% latex of $T_g$ 6 (resin #1) using water at 6, 22 and 50° C. The pictures were taken after the sample settled for 1 hour at room temperature. The supernatant of the untreated PCC (#0) is turbid and particles are well precipitated at the bottom of the sample. The PCC sample treated with latex (#1) followed by mixing with water at 6° C. initially is similar to untreated PCC. After settling for 1 hour at room temperature the turbidity slightly dropped. The PCC sample treated with latex then mixed with water at 22° C. (#1) has a less turbid filtrate. The PCC sample treated with latex then mixed with water at 50° C. (#2) presents a clearer filtrate and more aggregated particles than of sample #1. However, the PCC sample treated with latex then mixed with water at 80° C. (#3) its filtrate becomes quickly very clear and the particles are well aggregated.

Example 2

Figure 4:
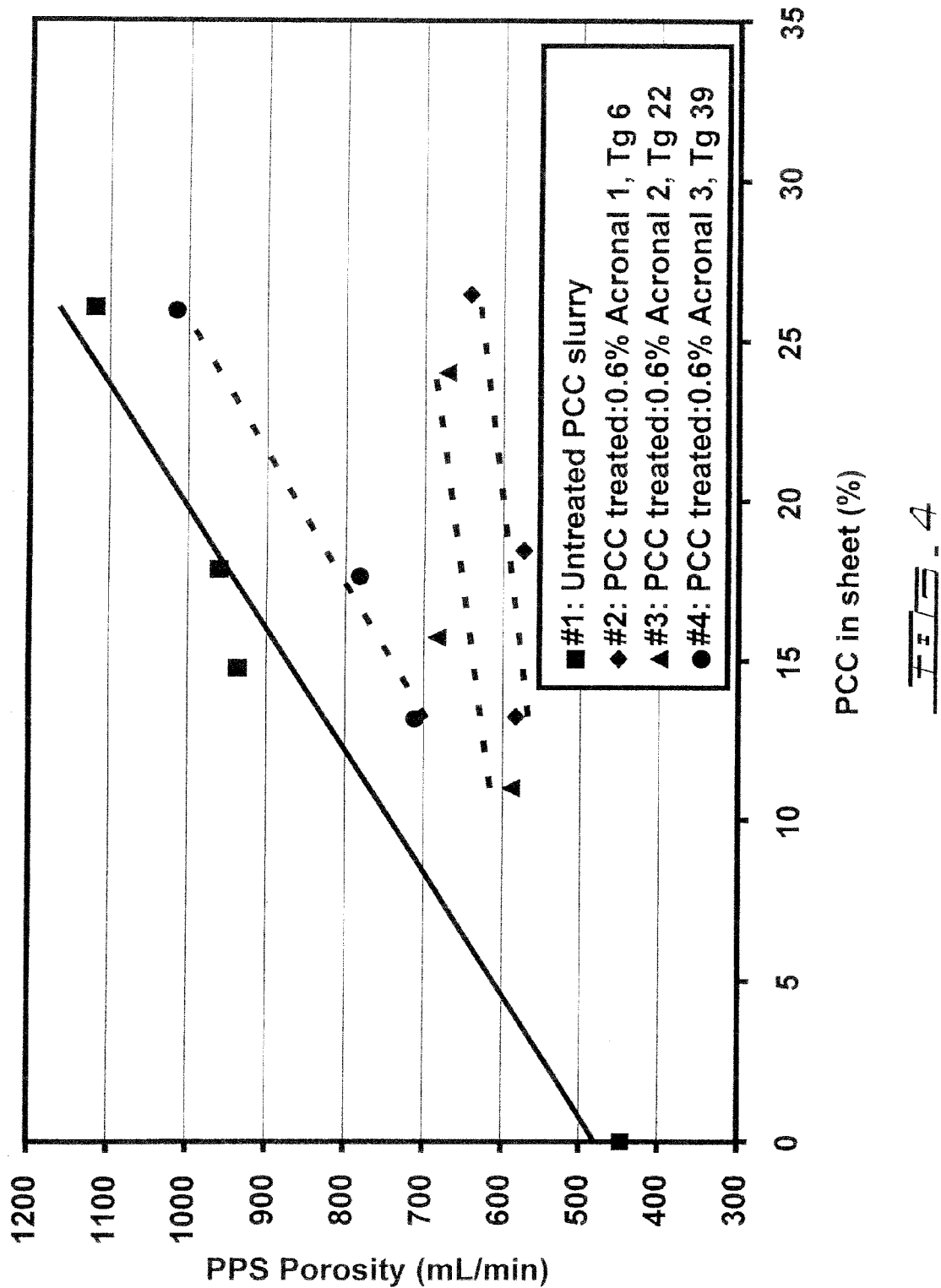

FIGS. 3 and 4 present the internal bond strength (Scott bond) and porosity of 70 g/m² sheets made with different levels of PCC (latex-treated and untreated slurries) at pH 8.2. Treated PCC slurries were prepared with the commercial Acronal resins (Table 1) of different glass transition temperatures at 50° C. The retention aid system was 0.03% CPAM (cationic polyacrylamide)/0.3% Bentonite.

FIGS. 3 and 4 show that in the absence of PCC treatment with Acronal latex the internal bond strength dropped linearly as the PCC level increased and the sheets became more porous (i.e., had a more open structure). PCC treatment with 0.6% latex followed by mixing for 60 seconds at 400 rpm with hot water at 50° C. improved the internal bond strength and reduced the porosity of handsheets. The best results, i.e., the highest Scott bond strength at a given sheet ash content, were obtained with the latex of the lowest $T_g$. This latex also gave sheets with the lowest porosity.

Example 3

Figure 5:
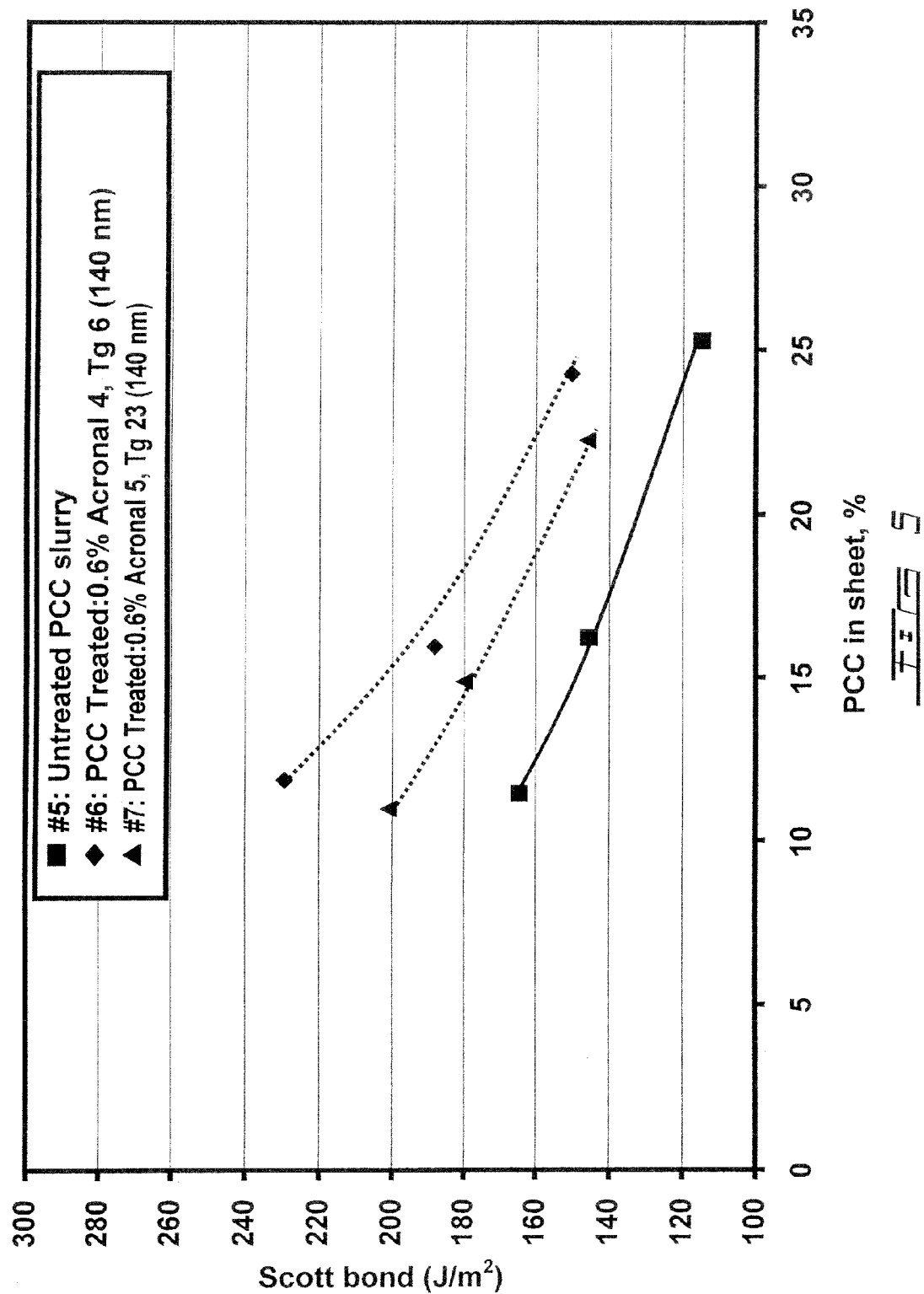
Figure 6:
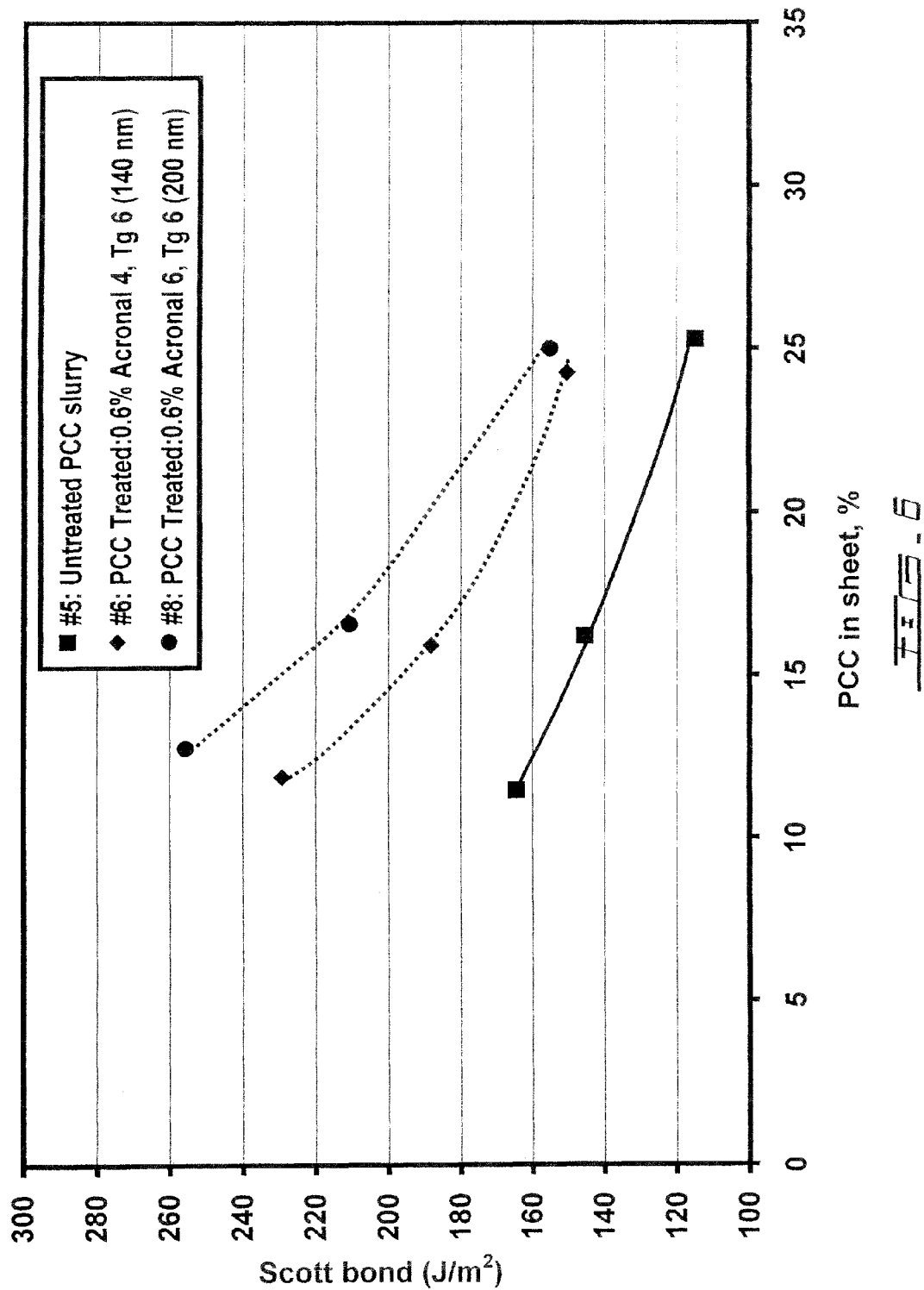

FIGS. 5 and 6 present the internal bond strength of 70 g/m² sheets made from a similar pulp furnish to the one used in Example 1. Treated PCC slurries were prepared with three laboratory Acronal latexes of different glass transition temperatures and different mean particle sizes (Table 2). The temperature of the hot water was maintained at 50° C. The retention aid system used during sheet making was 0.03% CPAM/0.3% Bentonite.

The FIGS. 5 and 6 show that in the absence of PCC treatment the internal bond strength dropped as the PCC level increased. However, PCC treatment with 0.6% resin followed by mixing with hot water (hot water temperature 50° C.) for 60 seconds at 400 rpm improved internal bond strength. The best results were obtained with the resin of $T_g$ 6° C. (resins 5 and 6). The particle size of resin dispersion, 140 nm or 200 nm, also had an effect on the resin performance for strength.

Example 4

Figure 7:
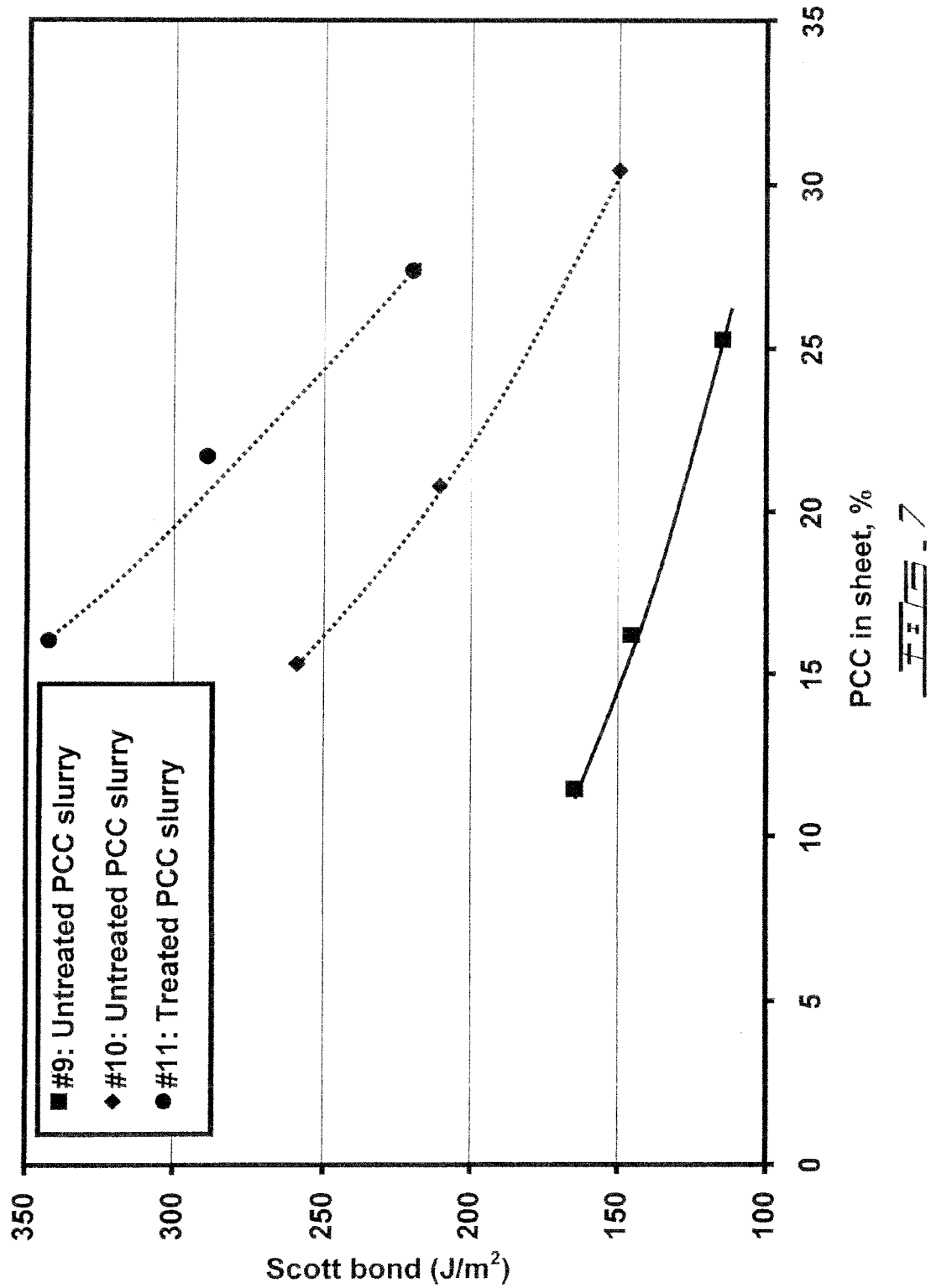
Figure 8:
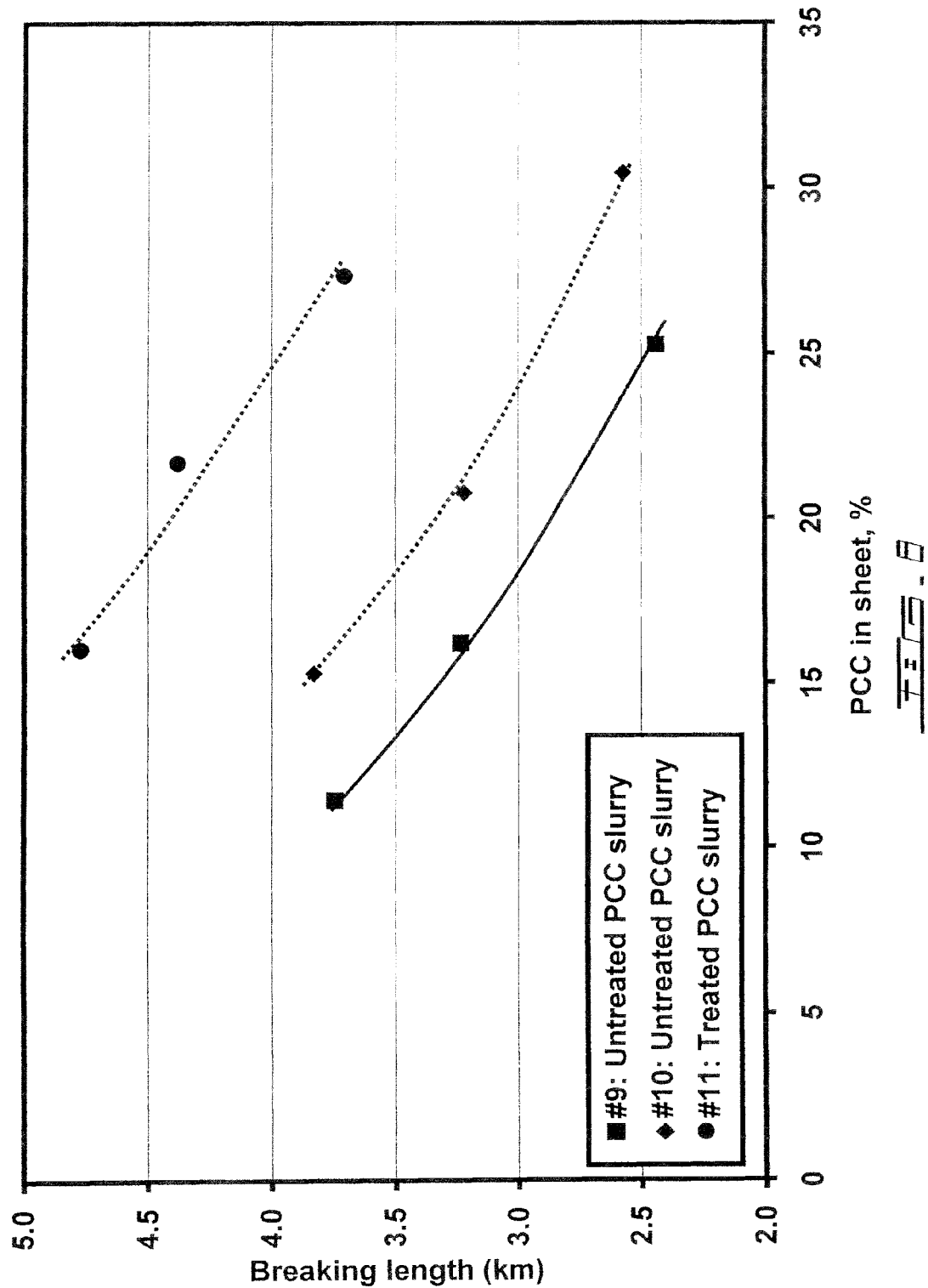

FIG. 7 and FIG. 8 present the internal bond strength and breaking length of 70 g/m² sheets made from a pulp furnish similar to that used in Example 2. Sample #9 was made from pulp mixed with an untreated PCC slurry followed by the addition of a retention aid system (0.03% CPAM/0.3% Bentonite). Sample #10 was made from pulp mixed with an untreated PCC slurry followed by the addition of a different retention aid system (0.6% cooked cationic corn starch and 0.06% anionic miro-polymer/0.06% colloidal silica). Sample #11 was pulp mixed with a PCC slurry treated with 0.6% Acronal latex 1 at 400 rpm using hot water as described in Example 2. The retention aid system was 0.6% cooked cationic corn starch/0.06% anionic mico-polymer/0.06% colloidal silica.

FIGS. 7 and 8 show that in the absence of PCC treatment with resin and hot water and with no cooked starch addition to the furnish the internal bond strength and breaking length both dropped as the PCC level increased. By adding the retention aid system (0.6% cooked starch/0.06% silica) to the pulp furnish containing untreated PCC both internal bond strength and breaking length improved. However, substantial improvements in internal bond strength and breaking length were achieved when the PCC slurry was treated with 0.6% latex and hot water followed by the addition of 0.6% cooked starch/0.06% silica to the furnish.

Example 5

Figure 9:
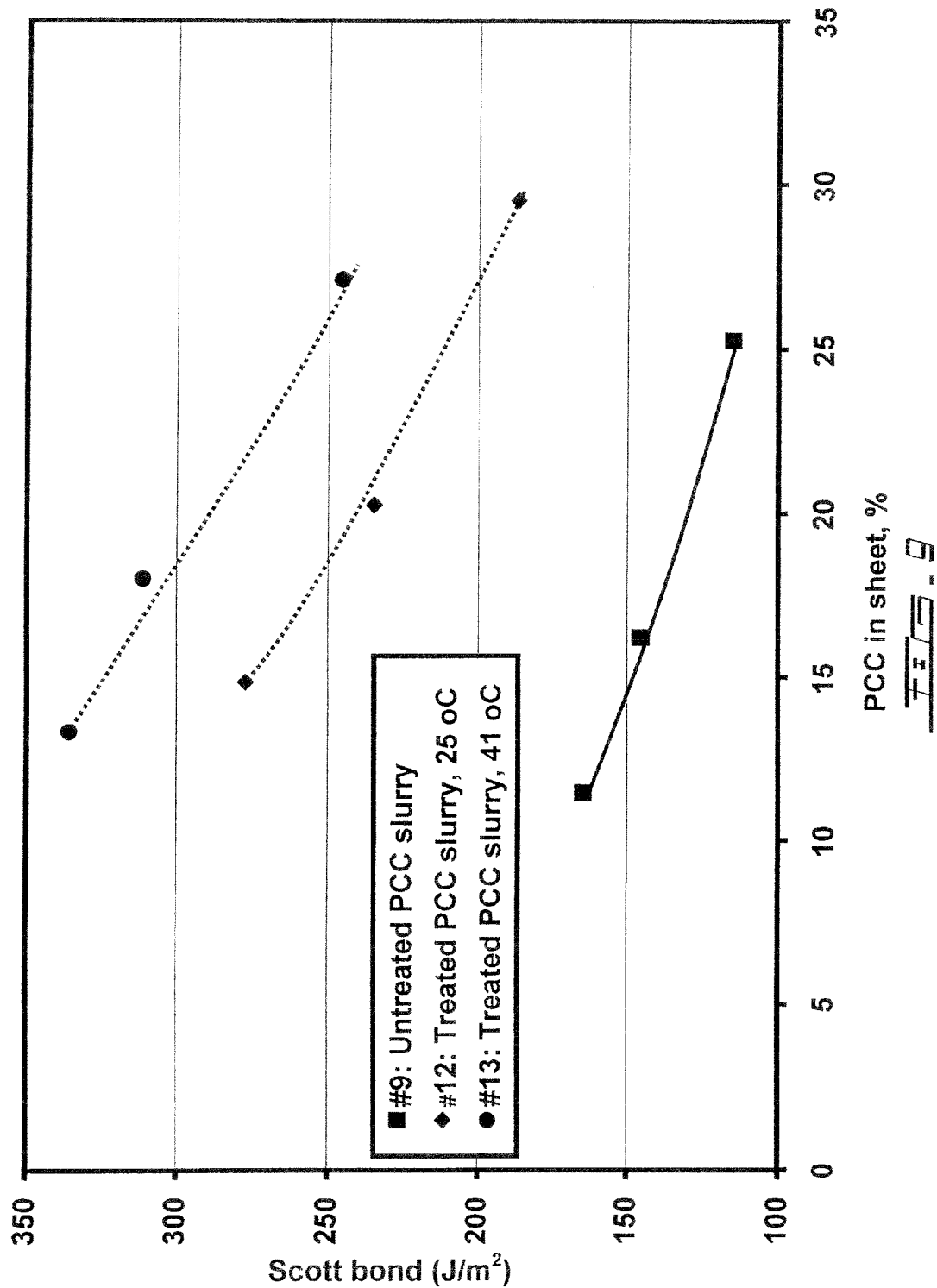
Figure 10:
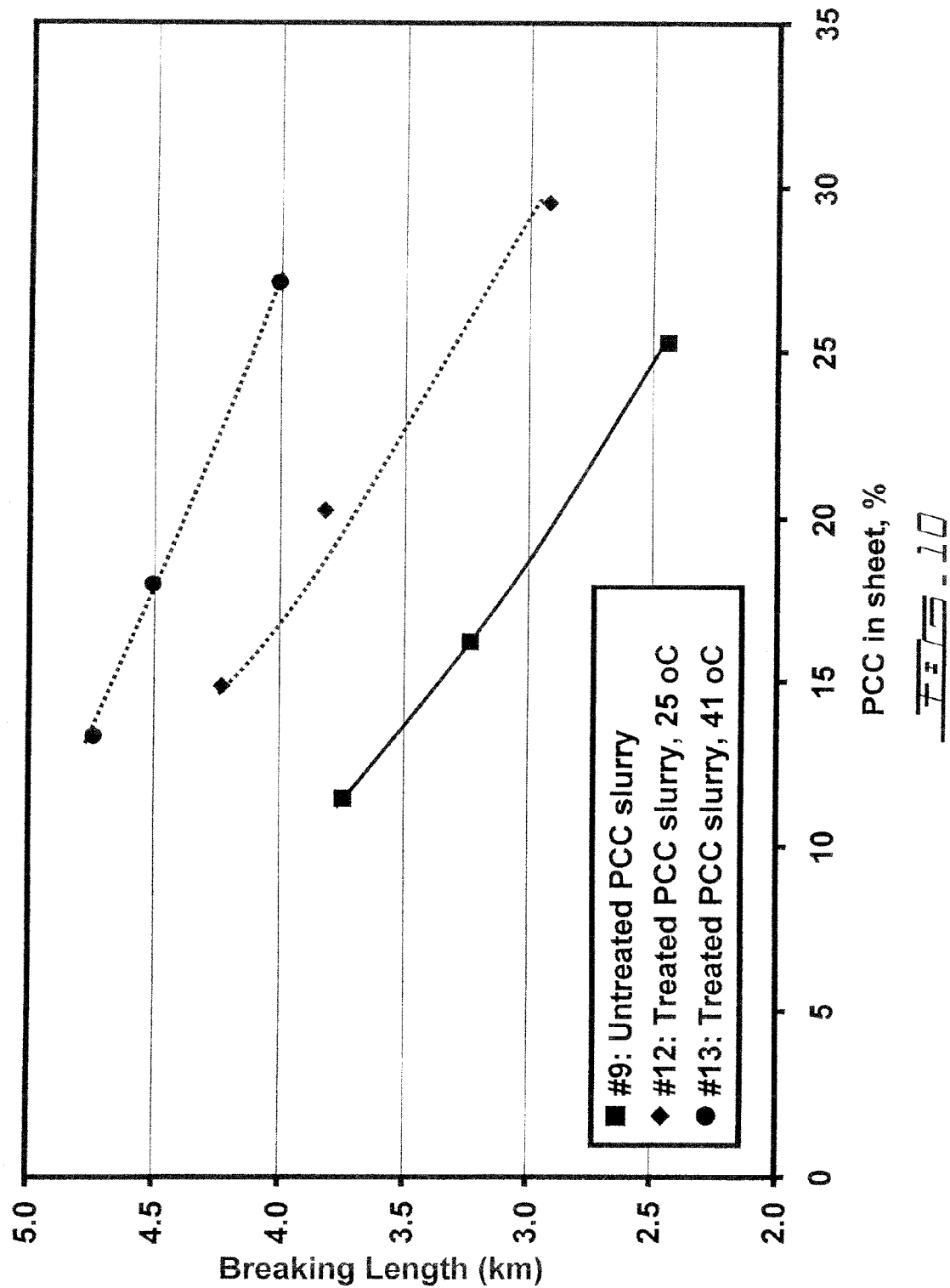

FIGS. 9 and 10 present the internal bond strength and breaking length of 70 g/m² sheets made from a pulp furnish similar to that used in to Example 2. Sample #9 was made from pulp mixed with an untreated PCC slurry followed by the addition of the retention aid system (0.03% CPAM/0.3% Bentonite). Sample #12 was made from pulp mixed with a PCC slurry treated with 0.3% Acronal latex 1 at room temperature—the PCC/resin blend was mixed without the addition of hot water. The retention aid system of 0.9% cooked cationic corn starch/0.06% anionic micro-polymer/0.06% colloidal silica was then added to furnish before sheet making. Sample #13 was made from pulp mixed with a treated PCC slurry as in sample #12, but in this case the PCC slurry was pre-heated to 41° C. before the addition of 0.3% Acronal latex 1 at 400 rpm. The retention aid system was 0.9% cooked cationic corn starch/0.06% anionic micro-polymer/0.06% colloidal silica.

FIGS. 9 and 10 show that in the absence of PCC treatment the internal bond strength and breaking length of sheets both dropped as the PCC level increased. The treatment of the PCC slurry with 0.3% Acronal latex 1 followed by the addition of 0.9% cooked starch/0.06% anionic micro-polymer/0.06% colloidal silica to the furnish substantially improved both internal bond strength and breaking length. However, the best improvement in these properties was achieved when the PCC slurry was pre-heated before introducing the 0.3% resin. This comparison study clearly indicates that fixation of the resin on PCC particles by hot water treatment is more beneficial for the strength development of filled papers.

Example 6

Figure 11:
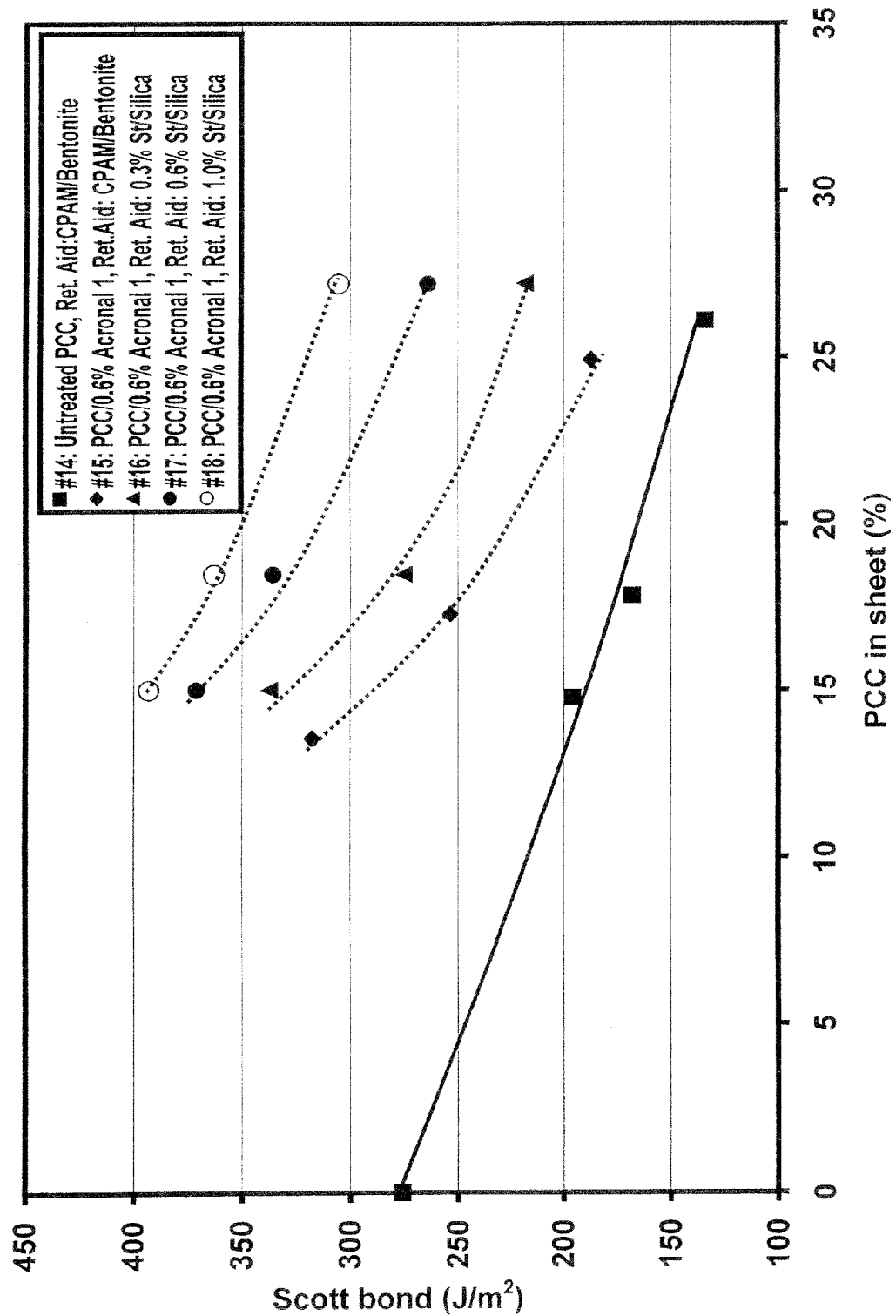
Figure 12:
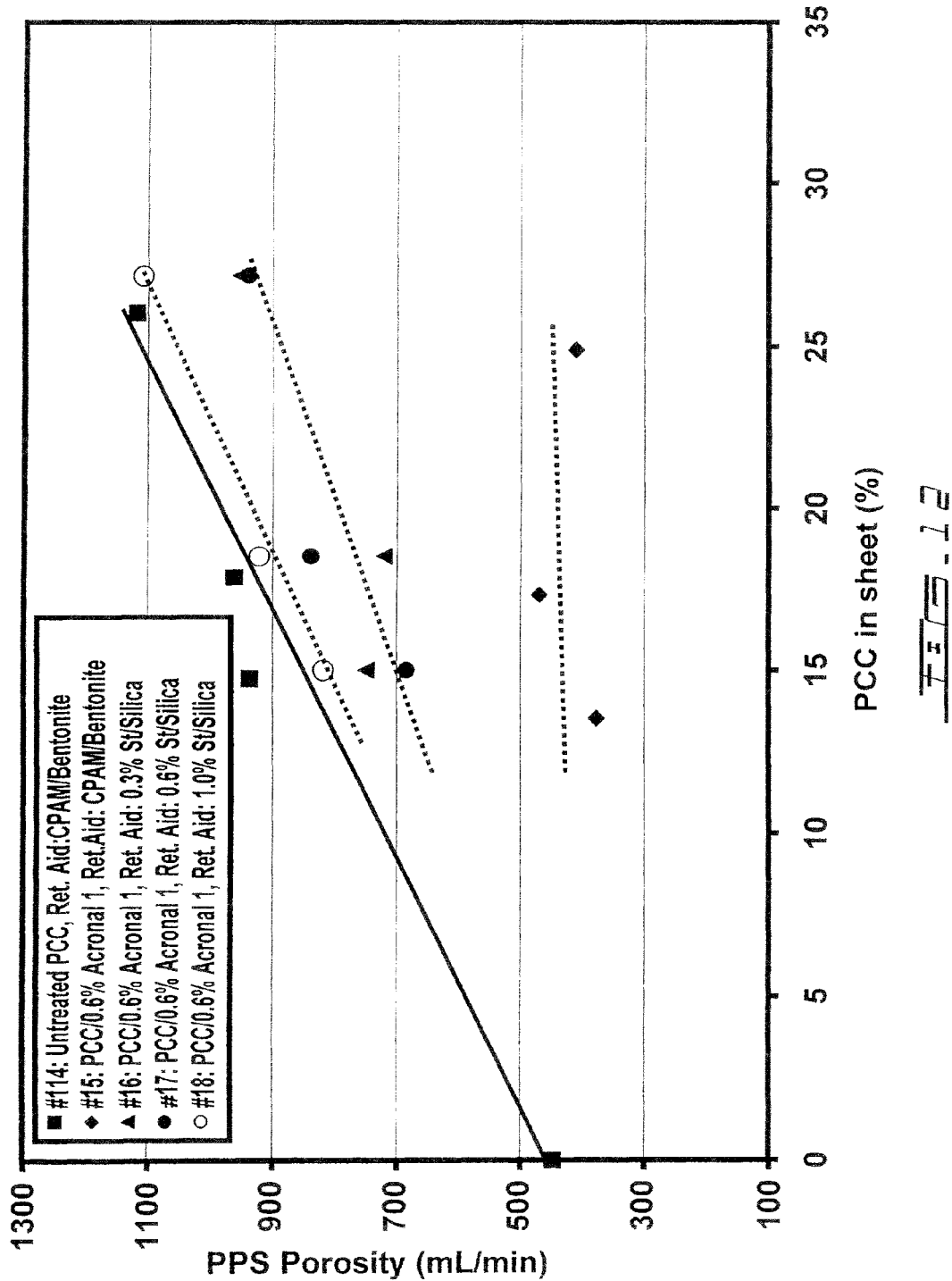
Figure 19:
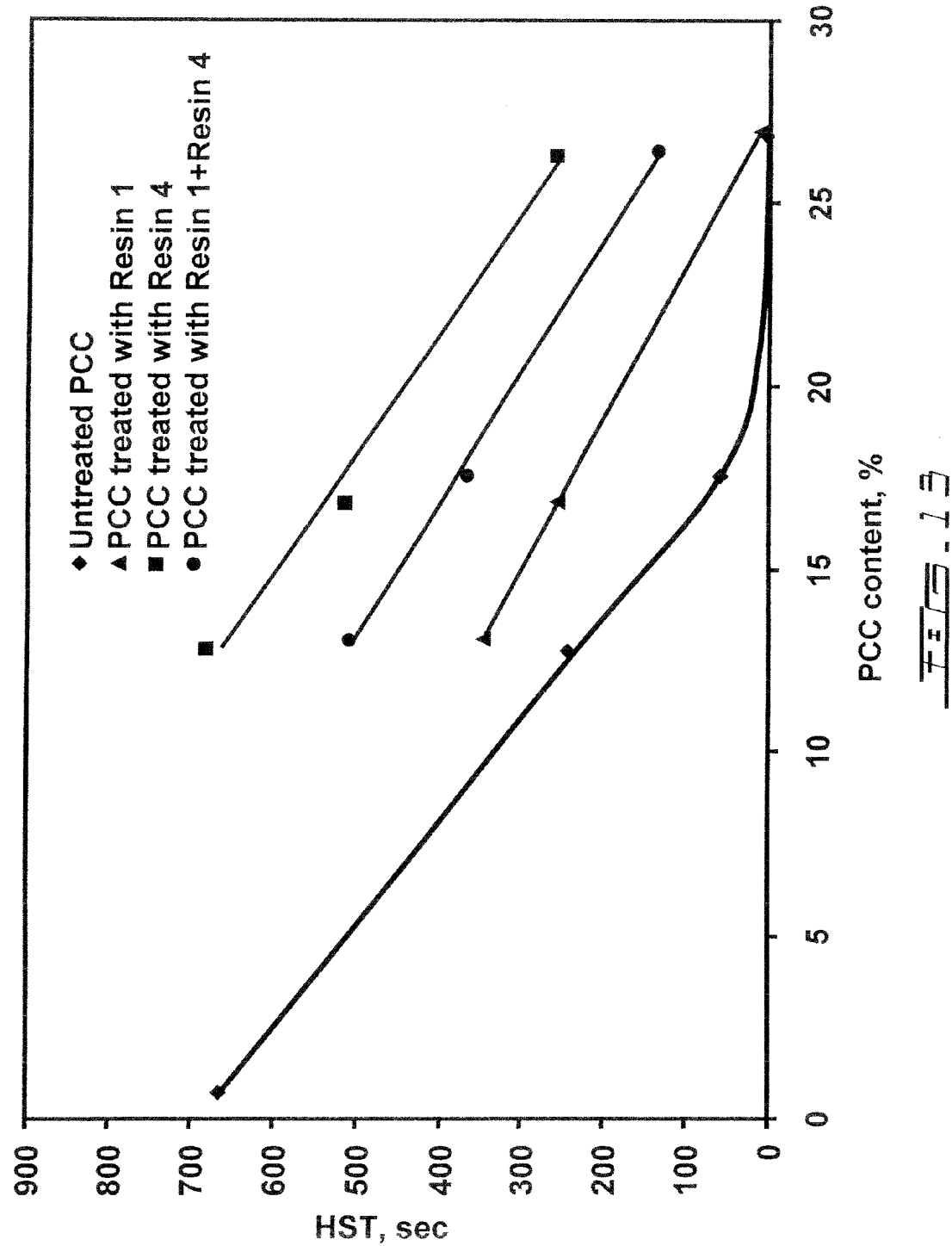

FIGS. 11 and 12 present the internal bond strength and PPS porosity of 70 g/m² sheets made from a pulp furnish similar to that used in Example 2. Sample #14 (control) was made from pulp mixed with an untreated PCC slurry followed by the addition of the retention aid system (0.03% CPAM/0.3% Bentonite). Sample #15 was made from the PCC slurry treated with 0.6% Acronal latex 1 using hot water at 50° C. The treated PCC slurry was then mixed with the pulp furnish followed by the addition of the retention aid system (0.03% CPAM/0.3% Bentonite). Samples #16, #17, and #18 were also made from the PCC slurry treated with 0.6% Acronal latex 1 using hot water at 50° C. The treated PCC slurry was mixed with the pulp furnish followed by the addition of different dosage rates of starch (0.3, 0.6, and 1.2% cationic corn starch) followed by the addition of 0.06% anionic micro-polymer/0.06% colloidal silica before sheet making.

FIGS. 11 and 12 show that in the absence of PCC treatment (Sample #14) the sheet internal bond strength decreased and porosity increased as the PCC level increased. Treating the PCC slurry with 0.6% latex followed by the addition of a retention aid (CPAM/Bentonite, i.e., Sample #15) improved both internal bond strength and porosity. For Samples #16, #17 and #18 the replacement of CPAM/Bentonite by cationic starch/anionic micro-polymer/silica significantly improved the internal strength, but as the dosage of the starch increased the porosity deteriorated. The improvement in strength was almost proportional to the dosage rate of starch. These results suggest that fixing the acrylic polymer dispersion with a low $T_g$ onto PCC particles and then adding cationic starch to the furnish can give substantial benefits for the strength development of filled papers.

Example 7

Figure 14:
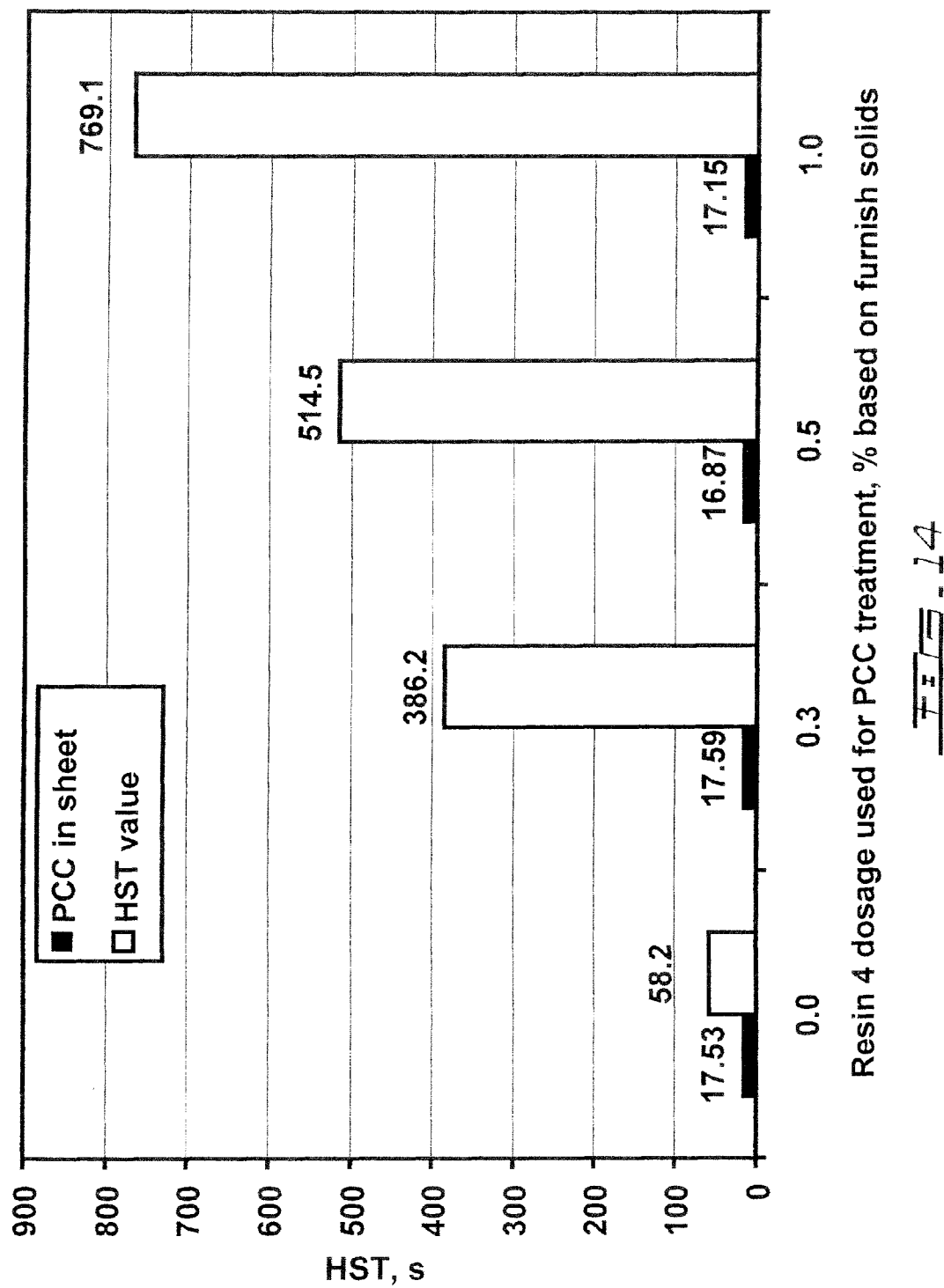

FIGS. 13 and 14 present the value of HST (Hercules Sizing Test) on 70 g/m² sheets made from a pulp furnish similar to that used in Example 2. HST is the time in seconds required for the ink to diffuse from one side of a paper sample to the other side—the longer the time the better the sizing degree.

For FIG. 13: The control sample was made from pulp mixed with untreated PCC and common wet-end additives. A fixed amount of 0.15% AKD emulsion (Basoplast 2030LC, 23% solids) was added first to the pulp furnish followed by PCC and then 0.7% cationic corn starch and 0.03% silica as the retention aid. The PCC slurry was treated with 0.5% resin 1 ($T_g$ 6 and particle size 190 nm) and 0.5% resin 4 ($T_g$ 49 and particle size 30 nm) using hot water at 50° C. The PCC slurry was also treated with 0.25% resin 1 plus 0.25% resin 4 using hot water at 50° C. The results of FIG. 13 clearly show that at a fixed addition dosage of 0.15% AKD emulsion as the PCC level increased to over 20% the HST value drastically dropped close to 0 sec. At a PCC level higher than 20% to obtain some sizing development two to three times more AKD emulsion was required. However, when the PCC slurry was treated with resin 1, resin 4 or the combination, prior to blending with the pulp furnish, the sizing was substantially improved. The best results were obtained when the PCC slurry was treated with resin 4 alone. Basoplast is a trademark.

For FIG. 14: the sheets were made from pulp mixed with untreated PCC and PCC treated with three levels of resin 4 and the common wet-end additives. First, a fixed amount of 0.15% AKD emulsion (Basoplast 2030LC, 23% solids) was added to the pulp furnish followed by PCC, then 0.7% cationic corn starch and 0.03% silica as a retention aid. The dosage of additives, whether added to the furnish or to PCC prior to mixing with the pulp, is based on the dry basis of furnish solids. FIG. 14 indicates how the sizing value substantially increased as the resin 4 dosage added to PCC increased.

Example 8

In this example the acid resistance of the resin-treated PCC filler slurry was measured by determining the level of acid required to maintain the diluted PCC slurry at pH 7. A smaller amount of acid consumed means the treatment is more acid resistant or dissolves less at neutral pH. The results show that when the PCC slurry at 20% solids was treated with 1% Acronal resin 1, according to the invention method, then diluted to 0.2% solids the amount of sulphuric acid required over time to maintain pH 7 was much lower than the untreated PCC slurry at 0.2% solids. For instance, the initial acid dosage rate to achieve pH 7 was 30 mL for the untreated PCC slurry and 9 mL for the resin-treated PCC slurry. After 1 hour of mixing the acid required to maintain pH 7 was 80 ml for the untreated PCC slurry and only 35 mL for the resin-treated PCC slurry.

The invention also contemplates:
A. A method for the complete and rapid fixation of anionic acrylic polymer (latex) dispersions, in which polymer latex dispersions are added to filler slurries at ambient temperature followed by mixing with hot water at a temperature higher than the $T_g$ of the latex; preferably the temperature of mixture (PCC/latex) is 30-60° C. higher than the $T_g$ of the latex used for complete fixation and particle agglomeration.
B. A continuous method consisting of treating filler slurries with anionic acrylic polymer dispersions by mixing with hot water in mixing vessels under controlled shear and mixing time.
Suitably, the latex-treated filler slurries prepared by mixing filler/acrylic polymer dispersions with hot water, are to be used in the manufacture of filled printing paper and paperboard products.

The invention claimed is:

1. A process of treating a filler comprising:
   forming a mixture of an aqueous slurry of particulate filler and an aqueous anionic latex of anionic latex resin solids, and
   mixing the mixture with hot water at a temperature higher than the Tg of the latex to irreversibly bind said anionic latex resin solids to surfaces of said particulate filler by adsorption and form aggregates of filler particles having said anionic latex resin solids irreversibly bound thereto, said particulate filler having an average particle size of 1 to 30 µm and being selected from the group consisting of kaolin clay, ground calcium carbonate, precipitated calcium carbonate, precipitated calcium sulphate, talc and mixtures of two or more thereof.

2. A process according to claim 1, wherein said filler has an average particle size of 1 to 10 µm.

3. A process according to claim 1, wherein the latex is in an amount to provide 1 to 100 kg latex/ton filler, based on the dry weight of latex resin solids and filler.

4. A process according to claim 3, wherein said latex is a dispersion of an acrylic polymer, said polymer having a Tg of −3 to 50° C. and an average particle size of 30 to 200 nm.

5. A process according to claim 4, wherein said acrylic polymer is selected from the group consisting of n-butyl acrylate-acrylonitrile-styrene copolymers and n-butyl acrylate-styrene copolymers.

6. An aqueous filler composition comprising aggregates consisting essentially of filler particles of a particulate filler with anionic latex resin solids fixed thereon by irreversible binding of said anionic latex resin solids to surfaces of said particulate filler by adsorption, in an aqueous vehicle, said particulate filler having an average particle size of 1 to 30 µm and being selected from the group consisting of kaolin clay, ground calcium carbonate, precipitated calcium carbonate, precipitated calcium sulphate, talc and mixtures of two or more thereof.

7. A filler composition according to claim 6, wherein said filler has an average particle size of 1 to 10 µm.

8. A filler composition according to claim 7, wherein said latex resin solids are in an amount to provide 1 to 100 kg latex/ton filler, based on the dry weight of latex resin solids and filler.

9. A filler composition according to claim 6, wherein said latex resin solids have a Tg of −3 to 50° C. and an average particle size of 30 to 200 nm.

10. A treated filler comprising aggregates consisting essentially of filler particles of a particulate filler with anionic latex resin solids fixed thereon by irreversible binding of said anionic latex resin solids to surfaces of said particulate filler by adsorption, said particulate filler having an average particle size of 1 to 30 µm and being selected from the group consisting of kaolin clay, ground calcium carbonate, precipitated calcium carbonate, precipitated calcium sulphate, talc and mixtures of two or more thereof.

11. A treated filler according to claim 10, wherein said filler has an average particle size of 1 to 10 µm.

12. A treated filler according to claim 11, wherein said latex resin solids are in an amount to provide 1 to 100 kg latex/ton filler, based on the dry weight of latex resin solids and filler.

13. A treated filler according to claim 10, wherein said latex resin solids have a Tg of −3 to 50° C. and an average particle size of 30 to 200 nm.

14. A pulp furnish comprising pulp fibres, and aggregates consisting essentially of filler particles of a particulate filler with anionic latex resin solids irreversibly fixed thereon by adsorption of said anionic latex resin solids on surfaces of said particulate filler at a temperature higher than the Tg of the anionic latex resin solids, in an aqueous vehicle, said particulate filler having an average particle size of 1 to 30 µm and being selected from the group consisting of kaolin clay, ground calcium carbonate, precipitated calcium carbonate, precipitated calcium sulphate, talc and mixtures of two or more thereof.

15. A pulp furnish according to claim 14, wherein said filler has an average particle size of 1 to 10 μm.

16. A pulp furnish according to claim 15, wherein said latex resin solids are in an amount to provide 1 to 100 kg latex/ton filler, based on the dry weight of latex resin solids and filler.

17. A pulp furnish according to claim 14, wherein said latex resin solids have a Tg of −3 to 50° C. and an average particle size of 30 to 200 nm.

18. A paper product formed of pulp fibres and aggregates consisting essentially of filler particles of a particulate filler, wherein said particulate filler has anionic latex resin solids irreversibly fixed thereon by adsorption of said anionic latex resin solids on surfaces of said particulate filler at a temperature higher than the Tg of the anionic latex resin solids, wherein said filler is a particulate filler selected from the group consisting of kaolin clay, ground calcium carbonate, precipitated calcium carbonate, precipitated calcium sulphate, talc and mixtures of two or more thereof, said particulate filler having an average particle size of 1 to 30 μm, said latex resin solids being in an amount to provide 1 to 100 kg latex/ton filler, based on the dry weight of latex resin solids and filler particles; and said latex resin solids have a Tg of −3 to 50° C. and an average particle size of 30 to 200 nm, and having an increased internal bond strength as compared with a corresponding paper product having said particulate filler but without said anionic latex resin solids.

19. A pulp furnish according to claim 14, wherein said particulate filler comprises precipitated calcium carbonate.

20. A paper according to claim 18, wherein said particulate filler comprises precipitated calcium carbonate.

* * * * *